United States Patent
Terashima et al.

(10) Patent No.: US 9,176,369 B2
(45) Date of Patent: Nov. 3, 2015

(54) PROJECTOR AND PROJECTION SYSTEM

(71) Applicant: SEIKO EPSON CORPORATION, Tokyo (JP)

(72) Inventors: Tetsuo Terashima, Azumino (JP); Shun Sato, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 183 days.

(21) Appl. No.: 14/095,352

(22) Filed: Dec. 3, 2013

(65) Prior Publication Data
US 2014/0168391 A1 Jun. 19, 2014

(30) Foreign Application Priority Data
Dec. 17, 2012 (JP) .................................. 2012-274698

(51) Int. Cl.
*H04N 13/04* (2006.01)
*G03B 21/20* (2006.01)
*H05B 41/39* (2006.01)

(52) U.S. Cl.
CPC ........ *G03B 21/2053* (2013.01); *H04N 13/0438* (2013.01); *H04N 13/0459* (2013.01); *H05B 41/39* (2013.01)

(58) Field of Classification Search
CPC .............. G03B 21/20; G03B 21/2026; G03B 21/2053; H05B 41/36; H05B 41/38; H05B 41/39; H04N 13/04; H04N 13/0438; H04N 13/0459; G05F 1/00; G05F 1/06; G05F 1/10
See application file for complete search history.

(56) References Cited

U.S. PATENT DOCUMENTS

| | | | |
|---|---|---|---|
| 5,608,294 A | 3/1997 | Derra et al. | |
| 6,239,556 B1 | 5/2001 | Derra et al. | |
| 7,250,732 B2 * | 7/2007 | Rahmane et al. | 315/291 |
| 7,443,103 B2 * | 10/2008 | Li et al. | 315/209 R |
| 8,008,868 B2 * | 8/2011 | Yamauchi | 315/291 |
| 8,120,282 B2 * | 2/2012 | Yamauchi | 315/307 |
| 8,506,092 B2 * | 8/2013 | Sato et al. | 353/85 |
| 8,591,034 B2 * | 11/2013 | Terashima et al. | 353/7 |
| 8,766,551 B2 * | 7/2014 | Terashima et al. | 315/287 |
| 8,773,036 B2 * | 7/2014 | Terashima | 315/287 |
| 8,783,876 B2 * | 7/2014 | Terashima et al. | 353/85 |

(Continued)

FOREIGN PATENT DOCUMENTS

| | | |
|---|---|---|
| JP | A 2004-296427 | 10/2004 |
| JP | B2 3741727 | 2/2006 |

(Continued)

*Primary Examiner* — Jori S Reilly-Diakun
(74) *Attorney, Agent, or Firm* — Oliff PLC

(57) ABSTRACT

A projector includes a discharge lamp, a discharge-lamp driving unit, a control unit, a light modulating element, and a projection optical system. The control unit alternately repeats a high luminance period in which a driving current having a relatively large absolute value is supplied to the discharge lamp and a low luminance period in which the driving current having a relatively small absolute value is supplied to the discharge lamp. The control unit controls the discharge-lamp driving unit according to a driving current waveform formed by the control waveform unit including a direct-current waveform pattern in which the driving current in a first high luminance period, the driving current in a first low luminance period immediately after the first high luminance period, and the driving current in a second high luminance period immediately after the first low luminance period have the same first polarity.

19 Claims, 11 Drawing Sheets

(56) References Cited

U.S. PATENT DOCUMENTS

| | | | |
|---|---|---|---|
| 8,922,630 B2 * | 12/2014 | Sato et al. | 348/55 |
| 2004/0178733 A1 | 9/2004 | Tukamoto et al. | |
| 2009/0207385 A1 * | 8/2009 | Yamauchi et al. | 353/85 |
| 2009/0213341 A1 * | 8/2009 | Yamauchi et al. | 353/85 |
| 2009/0237623 A1 * | 9/2009 | Yamauchi | 353/85 |
| 2009/0237625 A1 * | 9/2009 | Yamauchi | 353/85 |
| 2012/0026468 A1 | 2/2012 | Terashima et al. | |
| 2012/0038755 A1 | 2/2012 | Sato et al. | |
| 2012/0044466 A1 | 2/2012 | Sato et al. | |
| 2012/0154752 A1 | 6/2012 | Terashima et al. | |
| 2012/0154757 A1 | 6/2012 | Terashima | |
| 2012/0162611 A1 | 6/2012 | Terashima et al. | |

FOREIGN PATENT DOCUMENTS

| | | |
|---|---|---|
| JP | B2 4548940 | 9/2010 |
| JP | A 2012-32504 | 2/2012 |
| JP | A 2012-39497 | 2/2012 |
| JP | A 2012-42707 | 3/2012 |
| JP | A 2012-129049 | 7/2012 |
| JP | A 2012-133006 | 7/2012 |
| JP | A 2012-133272 | 7/2012 |
| WO | WO 95/35645 | 12/1995 |
| WO | WO 00/36883 | 6/2000 |

* cited by examiner

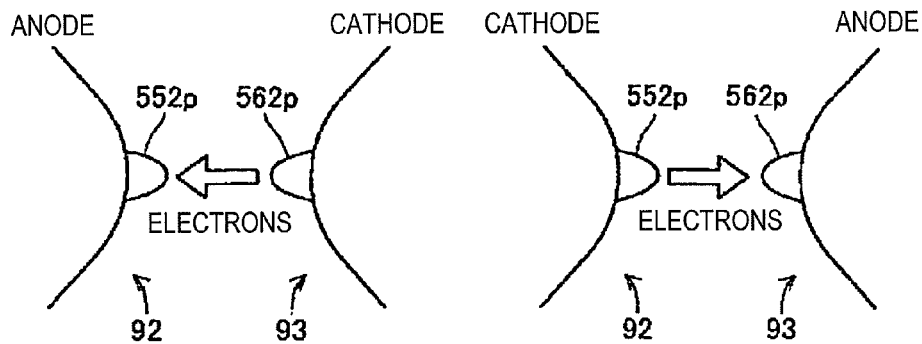
FIG. 6A  FIG. 6B
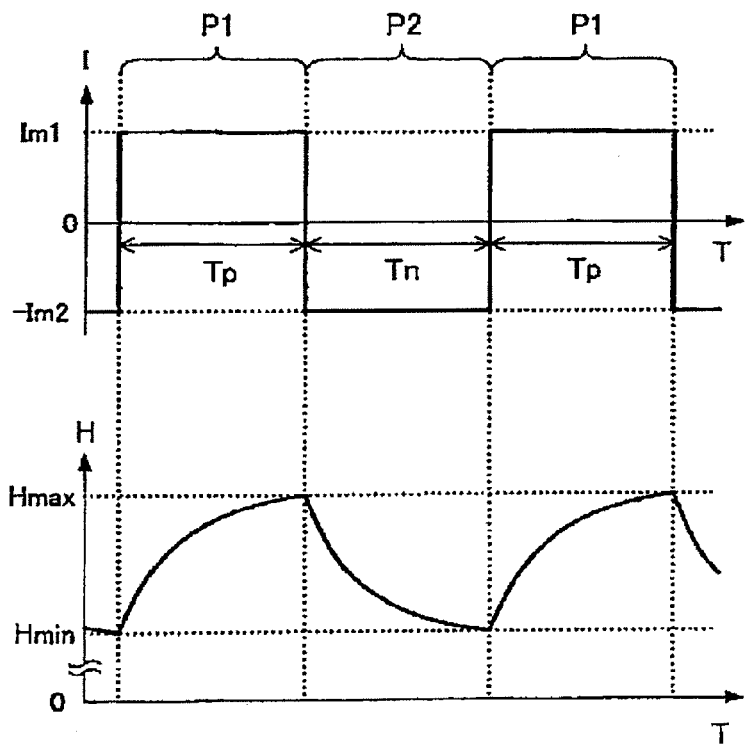
FIG. 6C
FIG. 6D

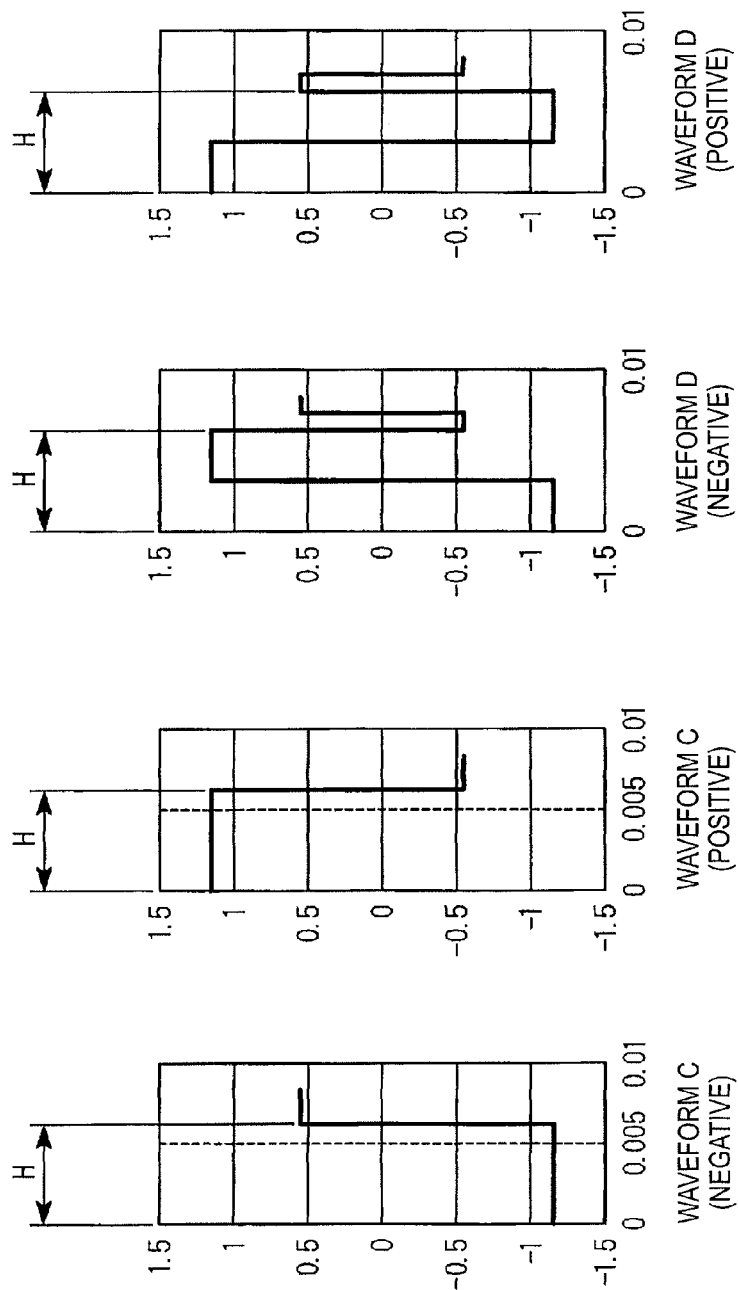

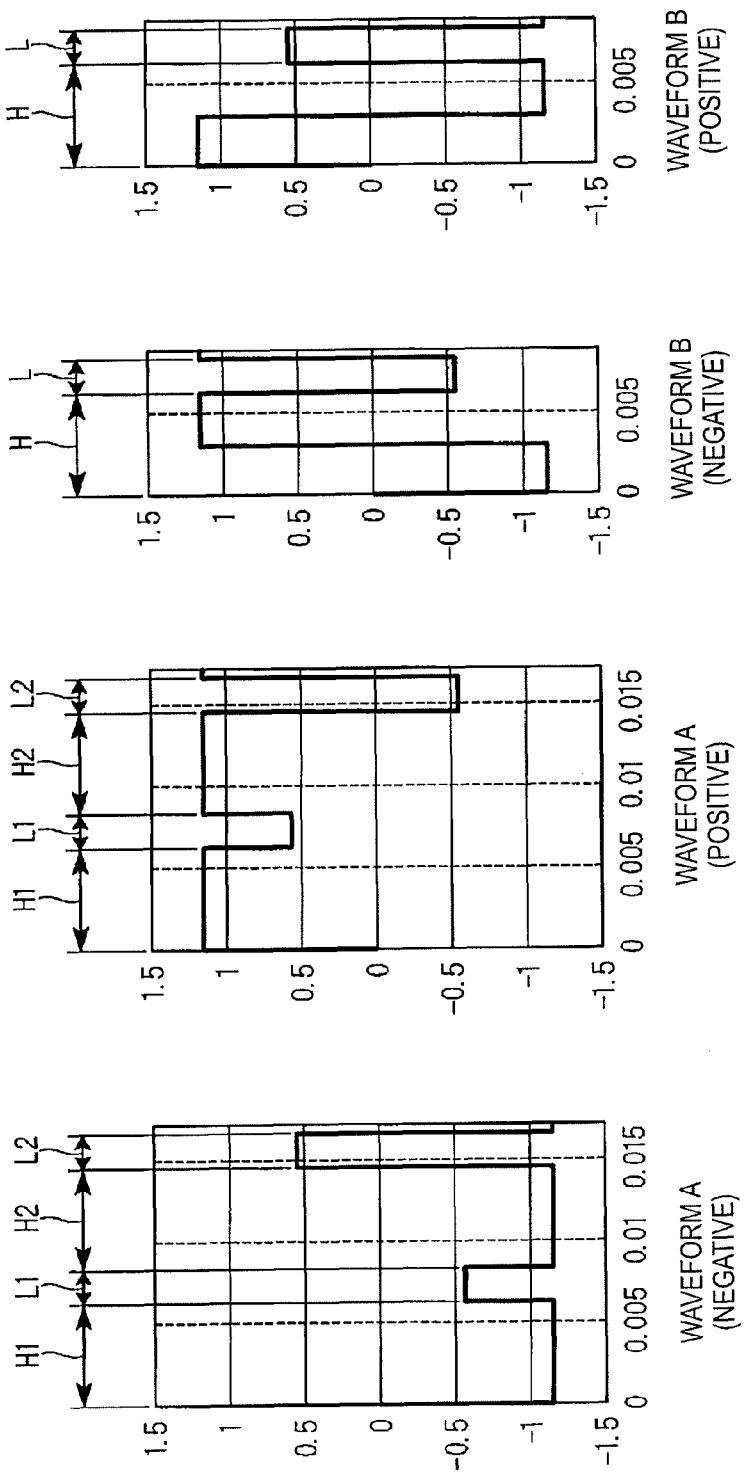

PROJECTOR AND PROJECTION SYSTEM

BACKGROUND

1. Technical Field

The present invention relates to a projector and a projection system.

2. Related Art

A projector adapted to 3D that realizes stereoscopic video display using a discharge lamp such as a high pressure mercury lamp has been put to practical use. In one system of the projector adapted to 3D, input signals are divided into a signal for left eye and a signal for right eye and sequentially alternately sent to alternately project a video for left eye and a video for right eye. An observer wears active shutter glasses, in which two shutters are alternately opened and closed, and selectively views the video for left eye and the video for right eye respectively with the left eye and the right eye. Consequently, the observer recognizes a video, which the observer is viewing, as a stereoscopic video. However, when the observer wears the active shutter glasses, a video entering the eyes of the observer is blocked by the shutters in a period substantially half of a viewing period. Therefore, the video is darkened.

To solve this problem, there have been proposed projectors that adopt a system for dimming the discharge lamp in synchronization with the active shutter glasses (see, for example, JP-A-2012-32504 (Patent Literature 1) and JP-A-2012-129049 (Patent Literature 2)). The projectors perform a dimming operation for increasing the luminance of the discharge lamp when the shutters of the glasses are opened and reducing the luminance of the discharge lamp when the shutters are closed. When such dimming is performed, it is possible to increase the luminance during the opening of the shutters by the decrease in the luminance during the closing of the shutters without changing average luminance of the discharge lamp. Consequently, the observer can visually recognize a bright video.

However, in the projector disclosed in Patent Literature 1, when such a dimming operation is cyclically repeated, protrusions formed at the distal ends of electrodes of the discharge lamp are sometimes deformed. This is considered to be because, when a period for reducing the luminance of the discharge lamp is cyclically present, supplied power to the discharge lamp is partially insufficient and melting of the electrodes is suppressed. This is because the protrusions are formed when the distal ends of the electrodes are moderately melted. In projectors in recent years, an alternating current is supplied to the discharge lamp in most cases. In the projector disclosed in Patent Literature 1, since the dimming operation is synchronized with a video signal, the frequency of the alternating current applied to the discharge lamp is considerably high. Therefore, an anode operation time is short and the distal ends of the electrodes are less easily heated. Consequently, when the deformation of the protrusions increases, the life of the discharge lamp decreases.

SUMMARY

An advantage of some aspects of the invention is to provide a projector and a projection system that can solve the decrease in the life of the discharge lamp due to the protrusions of the electrodes while exhibiting an effect on a video to the maximum.

An aspect of the invention is directed to a projector including: a discharge lamp configured to emit light; a discharge-lamp driving unit configured to supply a driving current for driving the discharge lamp to the discharge lamp; a control unit configured to control the discharge-lamp driving unit; a light modulating element configured to modulate, according to a video signal, the light emitted from the discharge lamp; and a projection optical system configured to project the light modulated by the light modulating element on a projection surface. The control unit is a control waveform unit configured to alternately repeat a high luminance period in which the driving current having a relatively large absolute value is supplied to the discharge lamp and a low luminance period in which the driving current having a relatively small absolute value is supplied to the discharge lamp. The control unit controls the discharge-lamp driving unit according to a driving current waveform formed by the control waveform unit including a direct-current waveform pattern in which the driving current in a first high luminance period, the driving current in a first low luminance period immediately after the first high luminance period, and the driving current in a second high luminance period immediately after the first low luminance period have the same first polarity.

The inventors have found that the meltability of electrodes is improved by securing a rather long period in which the driving current has the same polarity and have conceived of the projector according to the aspect of the invention.

With the projector according to the aspect of the invention, the driving current in the first high luminance period, the driving current in the first low luminance period, and the driving current in the second high luminance period of the control waveform unit, which forms the driving current waveform, have the same first polarity. Therefore, a long continuous anode operation time can be secured. As a result, compared with a projector in the past in which general alternating-current driving is used, the meltability of protrusions at the distal ends of an electrodes of the discharge lamp is improved and a protrusion shape is easily retained. Since the first low luminance period is present between the first high luminance period and the second high luminance period, the temperature of the electrodes fluctuates in a state in which the protrusions are melted. This action also makes it easy to retain the shape of the protrusions. According to the combination of these kinds of action, with the projector according to the aspect of the invention, it is possible to solve a decrease in the life of the discharge lamp.

The projector according to the aspect of the invention may be configured such that the control waveform unit includes the direct-current waveform pattern and an alternating-current waveform pattern.

With this configuration, by inserting the alternating-current waveform pattern into the control waveform unit, the meltability of the electrodes is suppressed from becoming too high. As a result, the shape of the protrusions is easily retained in a desired shape.

The projector according to the aspect of the invention may be configured such that the video signal includes a first video signal and a second video signal, a first video period in which the first video signal is written in the light modulating element a plurality of number of times and a second video period in which the second video signal is written in the light modulating element a plurality of number times are alternately repeated, in each of the first video period and the second video period, a period in which the second video signal is written in the light modulating element in which the first video signal is written or a period in which the first video signal is written in the light modulating element in which the second video signal is written is the low luminance period, and a period in which the first video signal is written in the light modulating element in which the first video signal is written or a period in which the second video signal is written in the light modulating element in which the second video signal is written is the high luminance period.

With this configuration, a transition period of the video signal in which the second video signal is written in the light modulating element in which the first video signal is written or the first video signal is written in the light modulating element in which the second video signal is written is allocated to the low luminance period. As a result, crosstalk of a first video formed by the first video signal and a second video formed by the second video signal is less easily recognized by an observer.

The projector according to the aspect of the invention may be configured such that the first video period is a video period for right eye and the second video period is a video period for left eye.

With this configuration, the observer can visually recognize a parallax video formed by a video for right eye projected in the video period for right eye and a video for left eye projected in the video period for left eye and recognize a stereoscopic video. When this configuration is combined with the configuration explained above, the luminance of the discharge lamp can be increased in a steady period other than the transition period by a reduction in the luminance of the discharge lamp in the transition period of the video signal. Therefore, a bright video is obtained.

The projector according to the aspect of the invention may be configured such that the control waveform unit includes a waveform pattern in which the driving current in a second low luminance period immediately before the first high luminance period or immediately after the second high luminance period has second polarity opposite to the first polarity.

With this configuration, a continuous anode operation time is interrupted by providing the second low luminance period in which the driving current has the second polarity. It is possible to set an anode operation time appropriate for the discharge lamp. As a result, it is possible to effectively solve the decrease in the life of the discharge lamp.

The projector according to the aspect of the invention may be configured such that the control unit controls the discharge-lamp driving unit to increase a ratio of an application period of the direct-current waveform pattern in an entire period of the control waveform unit according to an increase in a driving voltage.

The increase in the driving voltage occurs when the protrusions at the distal ends of the electrodes retract, deterioration of the electrodes progresses, and an inter-electrode distance increases. Therefore, if the ratio of the application period of the direct-current waveform pattern in the entire period of the control waveform unit is increased according to the increase in the driving voltage, the meltability of an anode is improved and deterioration of the electrodes can be suppressed. Further, it is possible to eliminate a deficiency in that, for example, the protrusions excessively grow and the driving current excessively increases or blackening of the electrodes occurs.

The projector according to the aspect of the invention may be configured such that the control unit controls the discharge-lamp driving unit to increase a ratio of a continuous application period of the direct-current waveform pattern in the entire period of the control waveform unit according to the increase in the driving voltage.

With this configuration, it is possible to further improve the meltability of the anode by increasing the ratio of the continuous application period of the direct-current waveform pattern. As a result, when the deterioration of the electrodes further progresses, it is possible to effectively cope with the deterioration of the electrodes.

The projector according to the aspect of the invention may be configured such that the control waveform unit includes, at least immediately before the first high luminance period or immediately after the second high luminance period, a second polarity high luminance period in which the driving current has second polarity opposite to the first polarity.

With this configuration, the length of a period in which the same polarity of the driving current continues can be adjusted as appropriate by providing the second polarity high luminance period. Consequently, it is possible to appropriately adjust the length of a period in which the driving current is biased to the same polarity in the control waveform unit and satisfactorily control the shape of the protrusions.

The projector according to the aspect of the invention may be configured such that the control unit controls the discharge-lamp driving unit to reduce the second polarity high luminance period according to an increase in the driving voltage or increase a ratio of a relatively short application period of the second polarity high luminance period according to the increase in the driving voltage.

If the second polarity high luminance period is reduced according to the increase in the driving voltage or the ratio of the relatively short application period of the second polarity high luminance period is increased according to the increase in the driving voltage as in this configuration, meltability of an anode is improved and deterioration of the electrodes can be suppressed. Further, it is possible to eliminate a deficiency in that, for example, the protrusions excessively grow and the driving current excessively increases or blackening of the electrodes occurs.

Another aspect of the invention is directed to a projection system including: the projector according to the aspect of the invention explained above; and active shutter glasses including a shutter for right eye and a shutter for left eye. The video signal includes a video signal for right eye and a video signal for left eye. A video period for right eye in which the video signal for right eye is written in the light modulating element and a video period for left eye in which the video signal for left eye is written in the light modulating element are alternately repeated. Switching of the video period for right eye and the video period for left eye in the light modulating element and switching of opening and closing operations for the shutter for right eye and the shutter for left eye in the active shutter glasses are synchronized.

With this configuration, it is possible to provide the projection system that can solve a decrease in the life of the discharge lamp and enables visual recognition of a stereoscopic image.

The projection system according to the aspect of the invention may be configured such that both of the shutter for right eye and the shutter for left eye are closed in a period in which the video signal for right eye and the video signal for left eye are mixed in the light modulating element.

With this configuration, crosstalk of a video for right eye and a video for left eye is suppressed. The observer can visually recognize a clear stereoscopic video.

BRIEF DESCRIPTION OF THE DRAWINGS

The invention will be described with reference to the accompanying drawings, wherein like numbers reference like elements.

FIGS. 6A to 6D are diagrams showing states of protrusions at electrode distal ends of the discharge lamp.

FIGS. 9A to 9D are enlarged diagrams showing a part of the driving current waveforms.

FIGS. 10A to 10D are enlarged diagrams showing a part of driving current waveforms in the past.

DESCRIPTION OF EXEMPLARY EMBODIMENTS

First Embodiment

Figure 1:
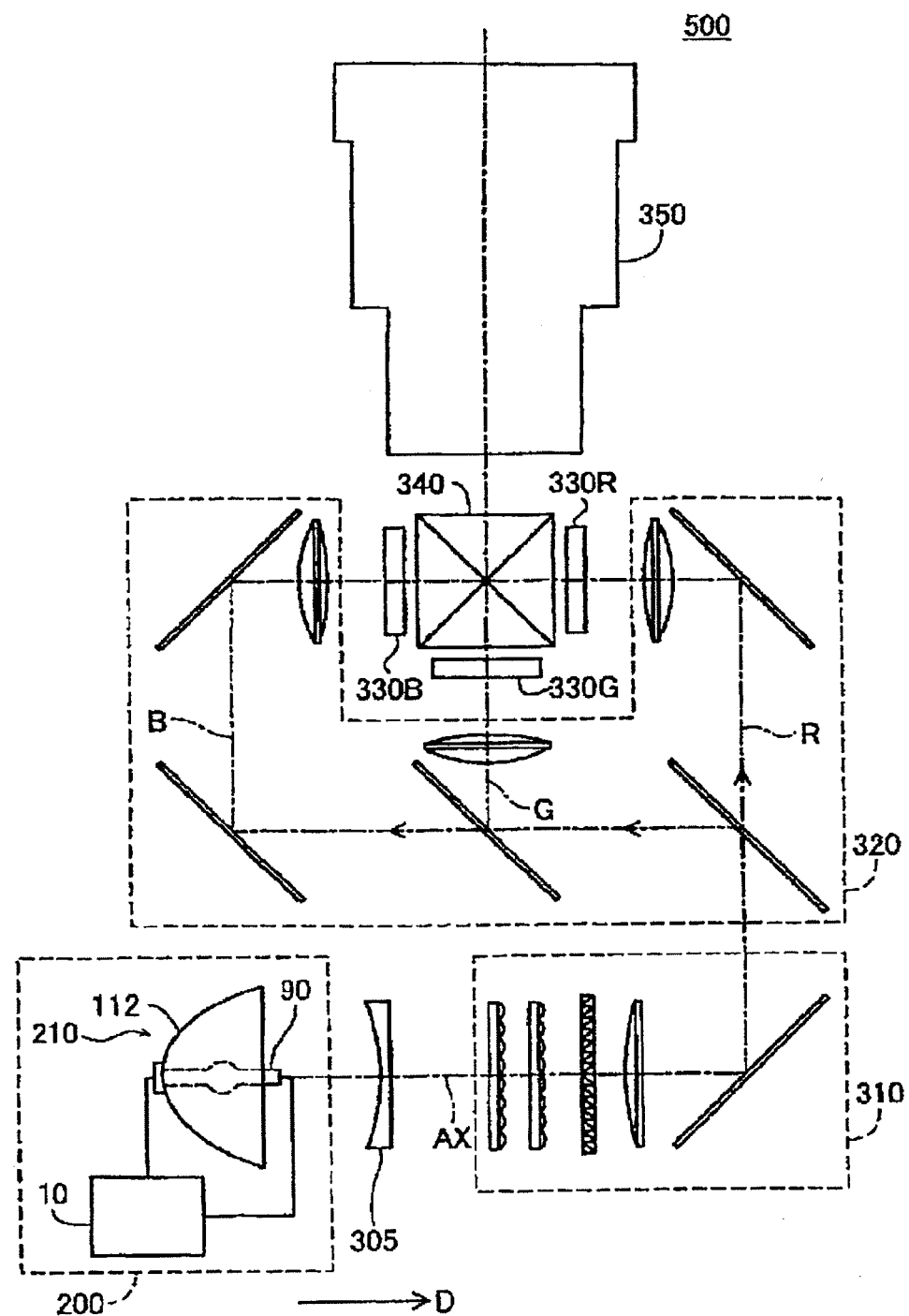
FIG. 1 is a schematic configuration diagram of a projector in a first embodiment.

A first embodiment of the invention is explained below with reference to FIGS. 1 to 10D.

In this embodiment, a projection system including a projector in which three sets of transmissive liquid crystal light valves are used as light modulating elements, a so-called 3CCD liquid crystal projector is illustrated.

In the drawings referred to below, to make it easy to see components, dimensions and scales are shown different depending on the components.

Figure 3:
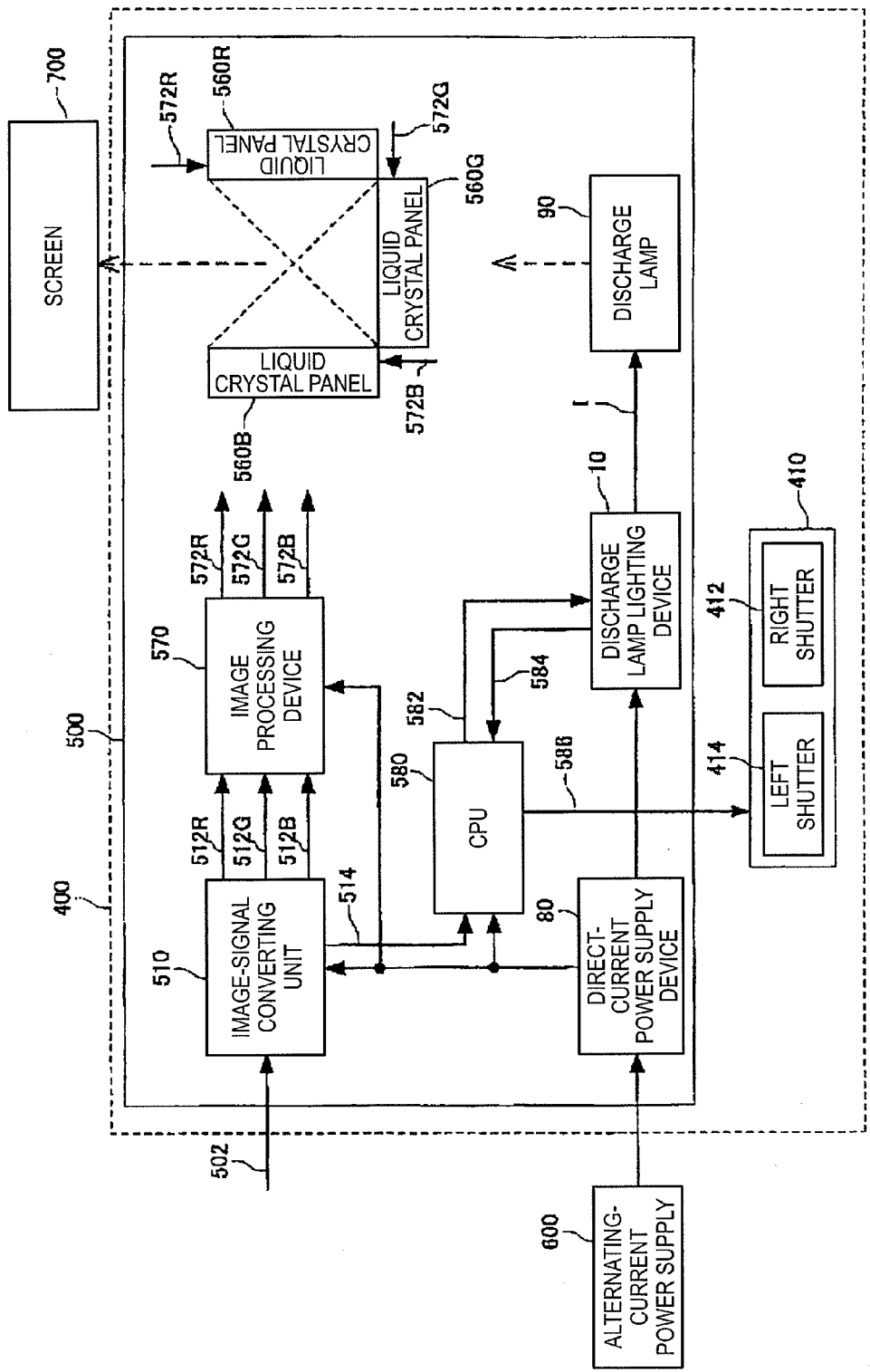
FIG. 3 is a block diagram showing various components of the projector.

As shown in FIG. 3, a projection system 400 in this embodiment includes a projector 500 and active shutter glasses 410. The projector 500 alternately projects a video for right eye and a video for left eye on a screen 700 in a time division manner. The active shutter glasses 410 include a shutter for right eye 412 and a shutter for left eye 414.

Switching of a video period for right eye in which the video for right eye is projected on the screen 700 and a video period for left eye in which the video for left eye is projected on the screen 700 and switching of opening and closing operations for the shutter for right eye 412 and the shutter for left eye 414 in the active shutter glasses 410 are synchronized. That is, in the video period for right eye, the shutter for right eye 412 is opened and the shutter for left eye 414 is closed. In the video period for left eye, the shutter for left eye 414 is opened and the shutter for right eye 412 is closed. By wearing the active shutter glasses 410 that perform such an operation, an observer can recognize a video, which the observer is viewing, as a stereoscopic video.

An optical system of the projector 500 is explained below.

As shown in FIG. 1, the projector 500 in this embodiment includes a light source device 200, a collimating lens 305, an illumination optical system 310, a color separation optical system 320, three liquid crystal light valves 330R, 330G, and 330B (light modulating elements), a cross dichroic prism 340, and a projection optical system 350.

Figure 2:
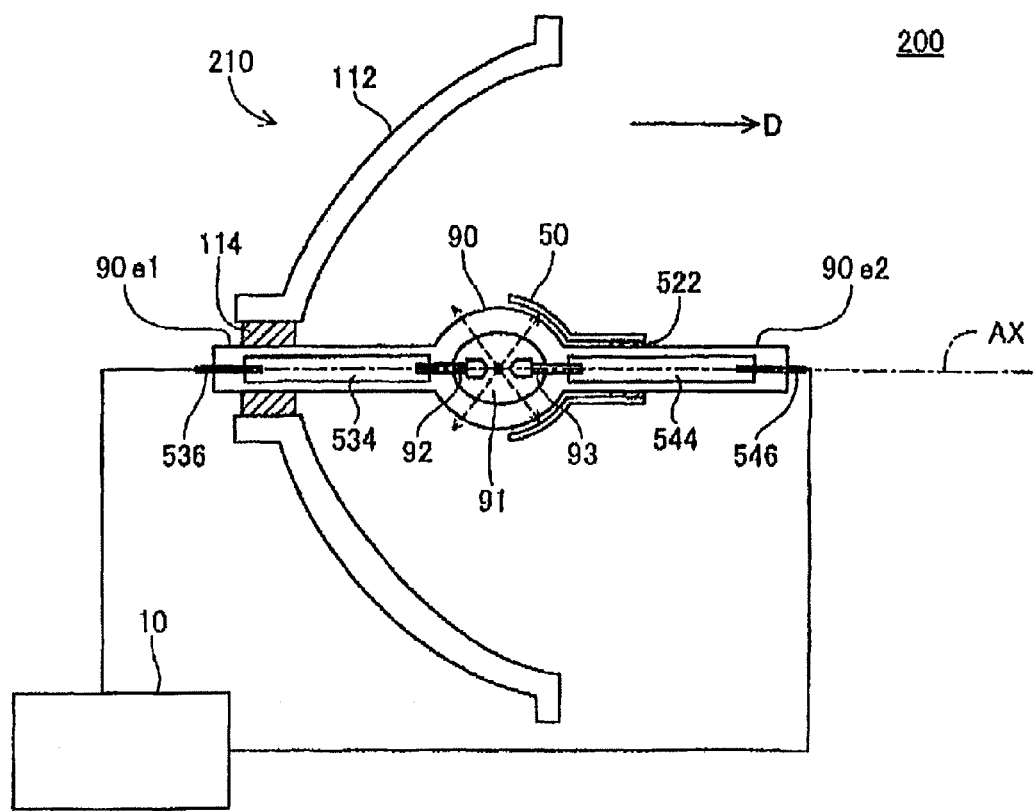
FIG. 2 is a sectional view of a discharge lamp.

As shown in FIG. 2, the light source device 200 includes a light source unit 210 and a discharge lamp lighting device 10. The light source unit 210 includes a main reflecting mirror 112, a sub-reflecting mirror 50, and a discharge lamp 90. The discharge lamp lighting device 10 supplies a driving current (driving power) to the discharge lamp 90 and lights the discharge lamp 90. The main reflecting mirror 112 reflects, in an irradiating direction D, light emitted from the discharge lamp 90. The irradiating direction D is parallel to an optical axis AX of the discharge lamp 90.

As shown in FIG. 1, light emitted from the light source unit 210 passes through the collimating lens 305 and is made incident on the illumination optical system 310. The collimating lens 305 has a function of collimating the light emitted from the light source unit 210.

The illumination optical system 310 has a function of uniformalizing the illuminance of the light emitted from the light source device 200 on the liquid crystal light valves 330R, 330G and 330B. The illumination optical system 310 also has a function of aligning a polarization direction of the light emitted from the light source device 200 in one direction. This is for the purpose of effectively using the light emitted from the light source device 200 in the liquid crystal light valves 330R, 330G, and 330B.

The light, the illuminance distribution and the polarization direction of which are adjusted, is made incident on the color separation optical system 320. The color separation optical system 320 separates the incident light into three color lights of red light (R), green light (G), and blue light (B). The three color lights are respectively modulated by the liquid crystal light valves 330R, 330G, and 330B associated with the respective colors. The liquid crystal light valves 330R, 330G, and 330B include liquid crystal panels 560R, 560G, and 560B explained below and sheet polarizers (not shown in the figure). The sheet polarizers are arranged on a light incident side and a light emission side of the respective liquid crystal panels 560R, 560G, and 560B.

The modulated three color lights are combined by the cross dichroic prism 340. The combined light is made incident on the projection optical system 350. The projection optical system 350 projects the incident light on the screen 700 (see FIG. 3). Consequently, a video for right eye or a video for left eye is displayed on the screen 700 in a time division manner. As the configurations of the collimating lens 305, the illumination optical system 310, the color separation optical system 320, the cross dichroic prism 340, and the projection optical system 350, well-known various configurations can be adopted.

FIG. 2 is a sectional view showing the configuration of the light source device 200. The light source device 200 includes the light source unit 210 and the discharge lamp lighting device 10. In FIG. 2, a sectional view of the light source unit 210 is shown. The light source unit 210 includes the main reflecting mirror 112, the discharge lamp 90, and the sub-reflecting mirror 50.

The shape of the discharge lamp 90 is a bar shape extending along the irradiating direction D. One end portion of the discharge lamp 90 is represented as first end portion 90e1. The other end portion of the discharge lamp 90 is represented as second end portion 90e2. The material of the discharge lamp 90 is a translucent material such as quartz glass. The center of the discharge lamp 90 is swelled in a spherical shape. The inside of the discharge lamp 90 is a discharge space 91. Gas, which is an electric discharge medium, including rare gas and a metal halogen compound is encapsulated in the discharge space 91.

The distal ends of a first electrode 92 and a second electrode 93 project to the discharge space 91. The first electrode 92 is arranged on the first end portion 90e1 side of the discharge space 91. The second electrode 93 is arranged on the second end portion 90e2 side of the discharge space 91. The shape of the first electrode 92 and the second electrode 93 is a bar shape extending along the optical axis AX. In the discharge space 91, electrode distal end portions of the first electrode 92 and the second electrode 93 are arranged to be opposed with a predetermined distance apart from each other. In the following explanation, the electrode distal end portion is sometimes referred to as "discharge end". The material of the first electrode 92 and the second electrode 93 is metal such as tungsten.

A first terminal 536 is provided at the first end portion 90e1 of the discharge lamp 90. The first terminal 536 and the first electrode 92 are electrically connected by a conductive member 534, which pierces through the inside of the discharge lamp 90. Similarly, a second terminal 546 is provided at the second distal end portion 90e2 of the discharge lamp 90. The second terminal 546 and the second electrode 93 are electrically connected by a conductive member 544, which pierces through the inside of the discharge lamp 90. The material of the first terminal 536 and the second terminal 546 is metal such as tungsten. As the material of the conductive members 534 and 544, for example, molybdenum foil is used.

The first terminal 536 and the second terminal 546 are connected to the discharge lamp lighting device 10. The discharge lamp lighting device 10 supplies a driving current for driving the discharge lamp 90 to the first terminal 536 and the second terminal 546. As a result, arc discharge occurs between the first electrode 92 and the second electrode 93. Light (discharge light) generated by the arc discharge is radiated in all directions from a discharge position as indicated by broken line arrows.

The main reflecting mirror 112 is fixed to the first end portion 90e1 of the discharge lamp 90 by a fixing member 114. The shape of a reflection surface (a surface on the discharge lamp 90 side) of the main reflecting mirror 112 is, for example, a spheroidal shape. The main reflecting mirror 112 reflects, in the irradiating direction D, light traveling toward the opposite side of the irradiating direction D in the discharge light. The shape of the reflection surface of the main reflecting mirror 112 is not limited to the spheroidal shape. Various shapes for reflecting the discharge light in the radiating direction D can be adopted. For example, a rotated parabolic shape may be adopted as the shape of the reflection surface of the main reflecting mirror 112. In this case, the main reflecting mirror 112 can convert the discharge light into light substantially parallel to the optical axis AX. Consequently, the collimating lens 305 can be omitted.

The sub-reflecting mirror 50 is fixed to the second end portion 90e2 side of the discharge lamp 90 by a fixing member 522. The shape of a reflection surface (a surface on the discharge lamp 90 side) of the sub-reflecting mirror 50 is a spherical shape surrounding a portion on the second end portion 90e2 side of the discharge space 91. The sub-reflecting mirror 50 reflects, to the main reflecting mirror 112, light traveling toward the opposite side of the arrangement side of the main reflecting mirror 112 in the discharge light. Consequently, efficiency of use of the light radiated from the discharge space 91 can be improved.

As the material of the fixing members 114 and 522, an arbitrary heat resistant material (e.g., an inorganic adhesive), which can withstand heat generation from the discharge lamp 90, can be adopted. A method of fixing an arrangement of the main reflecting mirror 112 and the sub-reflecting mirror 50 and the discharge lamp 90 is not limited to a method of fixing the main reflecting mirror 112 and the sub-reflecting mirror 50 to the discharge lamp 90. An arbitrary method can be adopted. For example, the discharge lamp 90 and the main reflecting mirror 112 may be independently fixed to a housing (not shown in the figure) of the projector 500. The same applies to the sub-reflecting mirror 50.

A circuit configuration of the projector 500 is explained below.

FIG. 3 is a diagram showing an example of the circuit configuration of the projector 500 in this embodiment. The projector 500 includes, besides the optical system explained above, an image-signal converting unit 510, a direct-current power supply device 80, the discharge lamp lighting device 10, the discharge lamp 90, the liquid crystal panels 560R, 560G, and 560B, an image processing device 570, and a CPU (Central Processing Unit) 580.

The image-signal converting unit 510 converts an image signal 502 (a luminance-color difference signal, an analog RGB signal, etc.) input from the outside into a digital RGB signal having a predetermined word length to generate image signals 512R, 512G, and 512B and supplies the image signals 512R, 512G, and 512B to the image processing device 570. When a stereoscopic video signal for alternately switching a video for right eye and a video for left eye at predetermined switching timing is input as the image signal 502, the image-signal converting unit 510 supplies a synchronization signal 514 to the CPU 580 on the basis of the switching timing for the video for right eye and the video for left eye.

The image processing device 570 applies image processing to each of the three image signals 512R, 512G, and 512B. The image processing device 570 supplies driving signals 572R, 572G, and 572B for respectively driving the liquid crystal panels 560R, 560G, and 560B to the liquid crystal panels 560R, 560G, and 560B.

The direct-current power supply device 80 converts an alternating-current voltage supplied from an alternating-current power supply 600 on the outside into a fixed direct-current voltage. The direct-current power supply device 80 supplies the direct-current voltage to the image-signal converting unit 510 present on a secondary side of a transformer (although not shown in the figure, included in the direct-current power supply device 80), the image processing device 570, and the discharge lamp lighting device 10 present on a primary side of the transformer.

The discharge lamp lighting device 10 generates a high voltage between the electrodes of the discharge lamp 90 during startup and causes dielectric breakdown to form a discharge path. Thereafter, the discharge lamp lighting device 10 supplies a driving current I for the discharge lamp 90 to maintain electric discharge.

The liquid crystal panels 560R, 560G, and 560B modulate, respectively on the basis of the driving signals 572R, 572G, and 572B, transmittances (luminances) of color lights made incident on the liquid crystal panels 560R, 560G, and 560B via the optical system explained above.

The CPU 580 controls various operations from the start of lighting to extinction of the projector 500. For example, in the example shown in FIG. 3, the CPU 580 outputs a lighting command and an extinction command to the discharge lamp lighting device 10 via a communication signal 582. The CPU 580 receives lighting information of the discharge lamp from the discharge lamp lighting device 10 via a communication signal 584. The CPU 580 outputs, on the basis of the synchronization signal 514, a control signal 586 for controlling the active shutter glasses 410 in synchronization with the image signal 502 to the active shutter glasses 410 via a wire or wireless communication means.

The active shutter glasses 410 include the shutter for right eye 412 and the shutter for left eye 414. Opening and closing operations for the shutter for right eye 412 and the shutter for left eye 414 are respectively controlled on the basis of the control signal 586. When the observer wears the active shutter glasses 410, the shutter for right eye 412 is closed, whereby a visual field on the right eye side is blocked. When the observer wears the active shutter glasses 410, the shutter for left eye 414 is closed, whereby a visual field on the left eye side is blocked. The shutter for right eye 412 and the shutter for left eye 414 are configured by, for example, liquid crystal shutters.

The configuration of the discharge lamp lighting device 10 is explained below.

Figure 4:
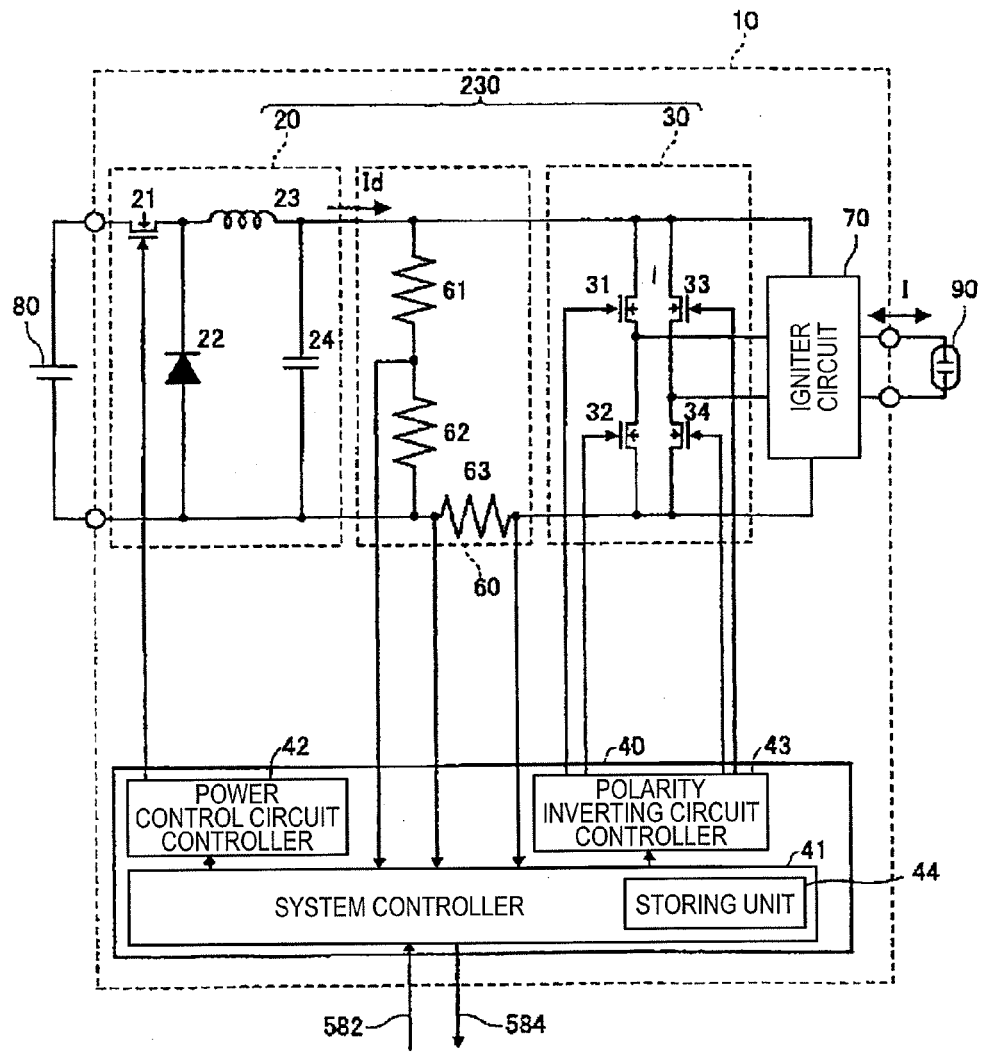
FIG. 4 is a circuit diagram of a discharge lamp lighting device.

FIG. 4 is a diagram showing an example of a circuit configuration of the discharge lamp lighting device 10. The discharge lamp lighting device 10 includes a power control circuit 20. The power control circuit 20 generates driving power supplied to the discharge lamp 90. In this embodiment, the power control circuit 20 is configured by a down-chopper circuit configured to receive a voltage from the direct-current power supply device 80 as an input, steps down the input voltage, and outputs a direct current Id.

The power control circuit 20 includes a switch element 21, a diode 22, a coil 23, and a capacitor 24. The switch element 21 is configured by, for example, a transistor. In this embodiment, one end of the switch element 21 is connected to a positive voltage side of the direct-current power supply device 80 and the other end is connected to a cathode terminal of the diode 22 and one end of the coil 23. One end of the capacitor 24 is connected to the other end of the coil 23. The other end of the capacitor 24 is connected to an anode terminal of the diode 22 and a negative voltage side of the direct-current power supply device 80. A current control signal is input to a control terminal of the switch element 21 from a control unit 40 (explained below). ON/OFF of the switch element 21 is controlled by the current control signal. As the current control signal, for example, a PWM (Pulse Width Modulation) control signal may be used.

When the switch element 21 is turned on, an electric current flows to the coil 23 and energy is accumulated in the coil 23. Thereafter, when the switch element 21 is turned off, the energy accumulated in the coil 23 is discharged through a path that passes the capacitor 24 and the diode 22. As a result, the direct current Id corresponding to a ratio of time when the switch element 21 is on is generated.

The discharge lamp lighting device 10 includes a polarity inverting circuit 30. The polarity inverting circuit 30 receives the direct current Id output from the power control circuit 20 and inverts the polarity of the direct current Id at predetermined timing. Consequently, the polarity inverting circuit 30 generates the driving current I, which is a direct current continuing for a controlled time, or the driving current I, which is an alternating current having an arbitrary frequency, and outputs the driving current I. In this embodiment, the polarity inverting circuit 30 is configured by an inverter bridge circuit (a full-bridge circuit).

The polarity inverting circuit 30 includes a first switch element 31, a second switch element 32, a third switch element 33, and a fourth switch element 34 configured by transistors or the like. The polarity inverting circuit 30 has a configuration in which the first switch element 31 and the second switch element 32 connected in series and the third switch element 33 and the fourth switch element 34 connected in series are connected in parallel to each other. Polarity inversion control signals are respectively input to control terminals of the first switch element 31, the second switch element 32, the third switch element 33, and the fourth switch element 34 from the control unit 40. ON/OFF operations for the first switch element 31, the second switch element 32, the third switch element 33, and the fourth switch element 34 are controlled on the basis of the polarity inversion control signal.

The polarity inverting circuit 30 repeats an operation for alternately turning on and off the first and fourth switch elements 31 and 34 and the second and third switch elements 32 and 33. Consequently, the polarities of the direct current Id output from the power control circuit 20 are alternately inverted. The driving current I, which is a direct current that continues the same polarity state for a controlled time, or the driving current I, which is an alternating current having a controlled frequency, is generated and output from a common connection point of the first switch element 31 and the second switch element 32 and a common connection point of the third switch element 33 and the fourth switch element 34.

That is, in the polarity inverting circuit 30, the first switch element 31, the second switch element 32, the third switch element 33, and the fourth switch element 34 are controlled such that, when the first switch element 31 and the fourth switch element 34 are on, the second switch element 32 and the third switch element 33 are off and, when the first switch element 31 and the fourth switch element 34 are off, the second switch element 32 and the third switch element 33 are on. Therefore, when the first switch element 31 and the fourth switch element 34 are on, the driving current I flowing from the one end of the capacitor 24 to the first switch element 31, the discharge lamp 90, and the fourth element 34 in this order is generated. When the second switch element 32 and the third switch element 33 are on, the driving current I flowing from the one end of the capacitor 24 to the third switch element 33, the discharge lamp 90, and the second switch element 32 in this order is generated.

In this embodiment, a combined portion of the power control circuit 20 and the polarity inverting circuit 30 corresponds to a discharge-lamp driving unit 230. That is, the discharge-lamp driving unit 230 supplies the driving current I for driving the discharge lamp 90 to the discharge lamp 90.

The discharge lamp lighting device 10 includes the control unit 40. The control unit 40 controls the discharge-lamp driving unit 230. In the example shown in FIG. 4, the control unit 40 controls the power control circuit 20 and the polarity inverting circuit 30 to thereby control a retention time in which the driving current I continues the same polarity and a current value, a frequency, and the like of the driving current I. The control unit 40 applies, to the polarity inverting circuit 30, polarity inversion control for controlling the retention time in which the driving current I continues in the same polarity and the frequency and the like of the driving current I according to polarity inversion timing of the driving current I. The control unit 40 applies, to the power control circuit 20, current control for controlling a current value of the direct current Id to be output.

The configuration of the control unit 40 is not specifically limited. In the case of this embodiment, the control unit 40 includes a system controller 41, a power control circuit controller 42, and a polarity inverting circuit controller 43. The control unit 40 may be partially or entirely configured by a semiconductor integrated circuit.

The system controller 41 controls the power control circuit controller 42 and the polarity inverting circuit controller 43 to thereby control the power control circuit 20 and the polarity inverting circuit 30. The system controller 41 may control the power control circuit controller 42 and the polarity inverting circuit controller 43 on the basis of a driving voltage V1a and the driving current I detected by a below-mentioned operation detecting unit 60 provided on the inside of the discharge lamp lighting device 10.

In this embodiment, the system controller 41 includes a storing unit 44. The storing unit 44 may be provided independently from the system controller 41.

The system controller 41 may control the power control circuit 20 and the polarity inverting circuit 30 on the basis of information stored in the storing unit 44. Information concerning driving parameters such as a retention time in which the driving current I continues in the same polarity and a current value, a frequency, a waveform, and a modulation pattern of the driving current I may be stored in the storing unit 44.

The power control circuit controller 42 outputs a current control signal to the power control circuit 20 on the basis of a control signal received from the system controller 41 to thereby control the power control circuit 20.

The polarity inverting circuit controller 43 outputs a polarity inversion control signal to the polarity inverting circuit 30 on the basis of a control signal from the system controller 41 to thereby control the polarity inverting circuit 30.

Figure 5:
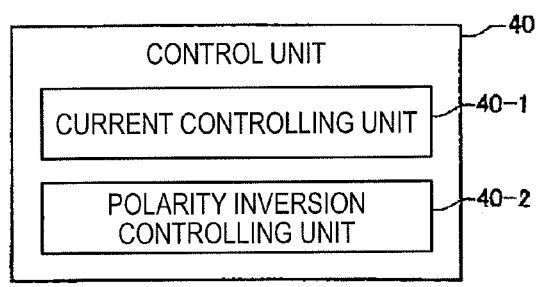
FIG. 5 is a block diagram showing a configuration example of a control unit.

The control unit 40 is realized using a dedicated circuit and can be configured to perform the control explained above and various kinds of control of processing explained below. On the other hand, for example, a CPU (Central Processing Unit) executes a control program stored in the storing unit 44, whereby the control unit 40 can be configured to function as a computer and perform the various kinds of control of the processing. FIG. 5 is a diagram for explaining another configuration example of the control unit 40. As shown in FIG. 5, the control unit 40 may be configured to, according to a control program, function as a current controlling unit 40-1 which controls the power control circuit 20 and a polarity inversion controlling unit 40-2 which controls the polarity inversing circuit 30.

In the example shown in FIG. 4, the control unit 40 is configured as a part of the discharge lamp lighting device 10. On the other hand, the CPU 580 may be configured to perform a part of functions of the control unit 40.

The discharge lamp lighting device 10 includes the operation detecting unit 60. The operation detecting unit 60 may includes, for example, a voltage detecting unit configured to detect the driving voltage V1a of the discharge lamp 90 and output driving voltage information to the control unit 40 and a current detecting unit configured to detect the driving current I and output driving current information to the control unit 40. In this embodiment, the operation detecting unit 60 includes a first resistor 61, a second resistor 62, and a third resistor 63.

In this embodiment, the voltage detecting unit detects the driving voltage V1a with a voltage divided by the first resistor 61 and the second resistor 62 connected in parallel to the discharge lamp 90 and connected in series to each other. In this embodiment, the current detecting unit detects the driving current I with a voltage generated in the third resistor 63 connected in series to the discharge lamp 90.

The discharge lamp lighting device 10 includes an igniter circuit 70. The igniter circuit 70 operates only during a lighting start of the discharge lamp 90. The igniter circuit 70 supplies, between the electrodes of the discharge lamp 90 (between the first electrode 92 and the second electrode 93), a high voltage (a voltage higher than a voltage during normal lighting of the discharge lamp 90) necessary for causing dielectric breakdown between the electrodes of the discharge lamp 90 (between the first electrode 92 and the second electrode 93) during the lighting start of the discharge lamp 90 and forming a discharge path. In this embodiment, the igniter circuit 70 is connected in parallel to the discharge lamp 90.

A relation between the polarity of the driving current I and the temperature of the electrodes is explained below.

FIGS. 6A to 6D are diagrams for explaining a relation between the polarity of the driving current I supplied to the discharge lamp 90 and the temperature of the electrodes. FIGS. 6A and 6B show operation states of the first electrode 92 and the second electrode 93. In the figures, the distal end portions of the first electrode 92 and the second electrode 93 are shown. Protrusions $552p$ and $562p$ are respectively formed at the distal ends of the first electrode 92 and the second electrode 93. Electric discharge that occurs between the first electrode 92 and the second electrode 93 mainly occurs between the protrusion $552p$ and the protrusion $562p$. When the protrusions $552p$ and $562p$ are present as in this embodiment, it is possible to suppress movement of discharge positions (arc positions) in the first electrode 92 and the second electrode 93 compared with the movement of the discharge positions that occurs when the protrusions are absent. However, such protrusions $552p$ and $562p$ do not always have to be formed.

FIG. 6A shows a first polarity state P1 in which the first electrode 92 operates as an anode and the second electrode 93 operates as a cathode. In the first polarity state P1, electrons move from the second electrode 93 (the cathode) to the first electrode 92 (the anode) according to electric discharge. The electrons are emitted from the cathode (the second electrode 93). The electrons emitted from the cathode (the second electrode 93) collide with the distal end of the anode (the first electrode 92). Heat is generated by the collision and the temperature of the distal end (the protrusion $552p$) of the anode (the first electrode 92) rises.

FIG. 6B shows a second polarity state P2 in which the first electrode 92 operates as a cathode and the second electrode 93 operates as an anode. In the second polarity state P2, in contrast to the first polarity state P1, electrons move from the first electrode 92 to the second electrode 93. As a result, the temperature of the distal end (the protrusion $562p$) of the second electrode 93 rises.

In this way, the temperature of the anode with which the electrons collide tends to be high compared with the temperature of the cathode from which the electrons are emitted. If a state in which the temperature of one electrode is high compared with the other electrode continues, it is likely that various deficiencies are caused. For example, when the distal ends of the electrodes having high temperature are excessively melted, unintended deformation of the electrodes could occur. As a result, an arc length sometimes deviates from a proper value. When the melting of the distal ends of the electrodes having low temperature is insufficient, it is likely that very small unevenness formed at the distal ends remains without being melted. As a result, so-called arc jump sometimes occurs (an arc position moves without being stabilized).

As a technique for suppressing such a deficiency, the use of alternating-current driving for repeatedly alternating the polarities of the electrodes has been examined.

FIG. 6C is a timing chart showing an example of the driving current I supplied to the discharge lamp 90. The abscissa indicates time T and the ordinate indicates a current value of the driving current I. The driving current I indicates an electric current flowing through the discharge lamp 90. A positive value indicates the first polarity state P1 and a negative value indicates the second polarity state P2.

In an example shown in FIG. 6C, a rectangular wave alternating current is used as the driving current I. In the example shown in FIG. 6C, the first polarity state P1 and the second polarity state P2 are alternately repeated. A first polarity section Tp indicates time in which the first polarity state P1 continues. A second polarity section Tn indicates time in which the second polarity state P2 continues. In the example shown in FIG. 6C, an average current value in the first polarity section Tp is Im1 and an average current value in the second polarity section Tn is −Im2. The frequency of the driving current I suitable for the driving of the discharge lamp 90 can be experimentally determined according to characteristics of the discharge lamp 90 (e.g., a value in a range of 30 Hz to 1 kHz is adopted). The other values Im1, −Im2, Tp, and Tn can also be experimentally determined.

FIG. 6D is a timing chart showing a temperature change of the first electrode 92. The abscissa indicates time T and the ordinate indicates temperature H. In the first polarity state P1, the temperature H of the first electrode 92 rises. In the second polarity state P2, the temperature H of the first electrode 92 falls. Since the first polarity state P1 and the second polarity state P2 are repeated, the temperature H cyclically changes between a minimum value Hmin and a maximum value Hmax. Although not shown in the figure, the temperature of the second electrode 93 changes in anti-phase to the temperature H of the first electrode 92. That is, in the first polarity state P1, the temperature of the second electrode 93 falls and, in the second polarity state P2, the temperature of the second electrode 93 rises.

In the first polarity state P1, since the distal end of the first electrode 92 (the protrusion 552p) is melted, the distal end of the first electrode 92 (the protrusion 552p) is smoothed. Consequently, movement of the discharge position in the first electrode 92 can be suppressed. Since the temperature of the distal end of the second electrode 93 (the protrusion 562p) falls, excessive melting of the second electrode 93 (the protrusion 562p) is suppressed. Consequently, unintended deformation of the electrodes can be suppressed. In the second polarity state P2, action in the first electrode 92 and the second electrode 93 is opposite to the action explained above. Therefore, it is possible to suppress deficiencies in the first electrode 92 and the second electrode 93 by alternately repeating the two polarity states.

When the waveform of the current I is symmetrical, that is, when the waveform of the current I satisfies a condition "|Im1|=|−Im2, Tp=Tn", a condition for supplied power is the same between the first electrode 92 and the second electrode 93. Therefore, if thermal conditions (easiness of temperature rise and easiness of temperature fall) of the first electrode 92 and the second electrode 93 are the same, it is estimated that a temperature difference between the first electrode 92 and the second electrode 93 is small. However, when the thermal conditions of the first electrode 92 and the second electrode 93 are different, it is likely that the protrusion at the distal end portion of the electrode on a side easily having higher temperature under the thermal condition disappears. When the protrusion at the electrode distal end portion disappears, a start point of arc becomes unstable or further deformation of the electrode is caused. Blackening and needle crystal formation more easily advance in which an excessive electrode material evaporates from the electrode distal end portion easily having higher temperature under the thermal condition and adheres to a sealing body.

When the electrodes are excessively heated over a wide range, arc spots (hot spots on the electrode surfaces involved in arc discharge) increase in size. At this point, the electrodes lose shape because of excessive melting. Conversely, when the electrodes are excessively cooled, the arc spots decrease in size. At this point, the distal ends of the electrodes cannot be sufficiently melted, action for smoothing the distal ends less easily occurs, and the distal ends of the electrodes tend to be deformed. Therefore, when a uniform energy supply state is continued for the electrodes, the distal ends (the protrusion 552p and the protrusion 562p) of the electrodes tend to be deformed into an unintended shape.

A specific example of control of the driving current I in the projector 500 according to this embodiment is explained.

Figure 7:
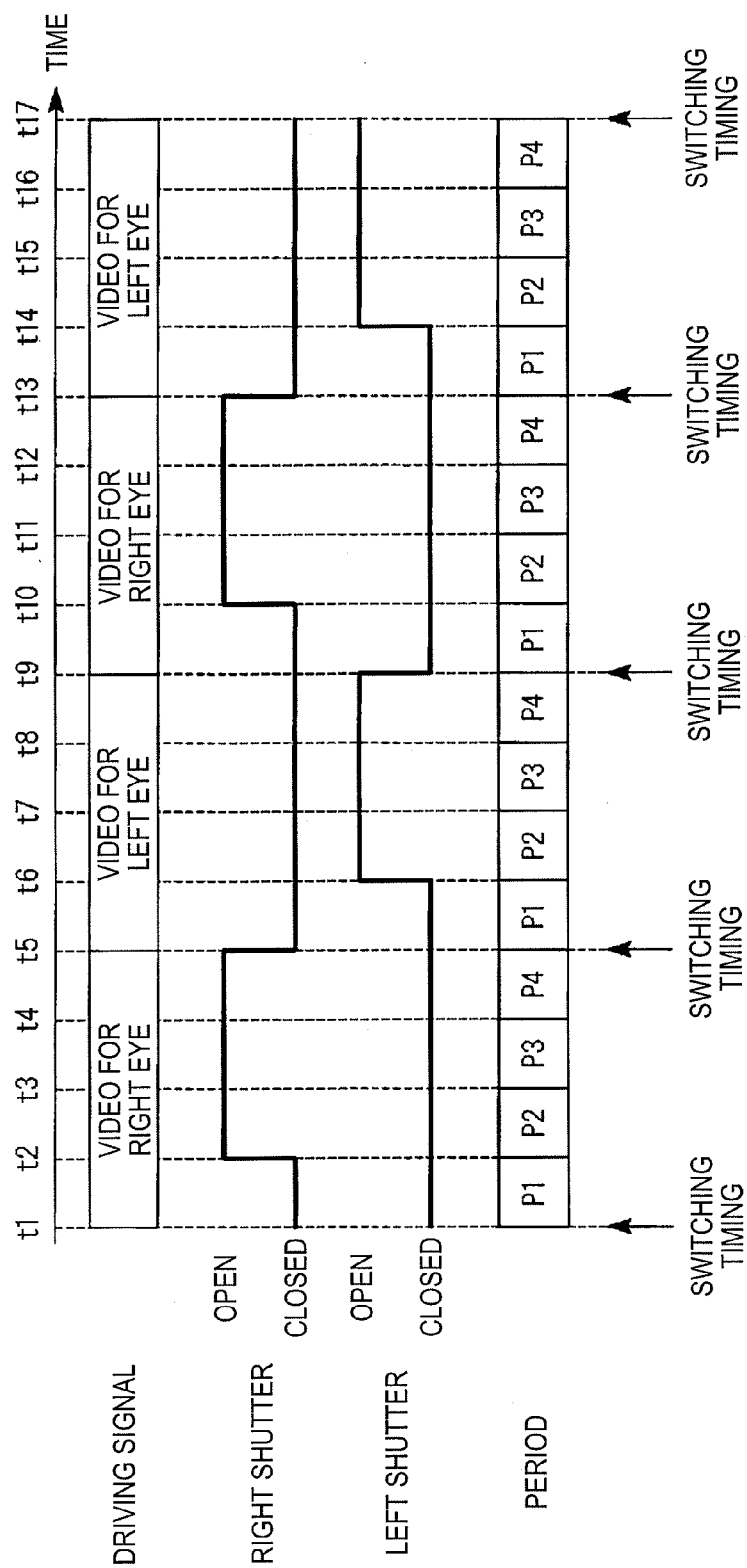
FIG. 7 is a timing chart of various operations of the projector.

FIG. 7 is a diagram for explaining a first period P1 to a fourth period P4 and switching timings. In FIG. 7, in order from the above, contents of the driving signals 572R, 572G, and 572B, an opening and closing state of the shutter for right eye 412, an opening and closing state of the shutter for left eye 414, and a temporal relation between the first period P1 to the fourth period P4 and the switching timings are shown. The abscissa of FIG. 7 indicates time.

In an example shown in FIG. 7, the driving signals 572R, 572G, and 572B are driving signals corresponding to a video for right eye in a period from time t1 to time t5, driving signals corresponding to a video for left eye in a period from time t5 to time t9, driving signals corresponding to the video for right eye in a period from time t9 to time t13, and driving signals corresponding to the video for left eye in a period from time t13 to time t17. Thereafter, this is repeated. Therefore, in the example shown in FIG. 7, the projector 500 switches and alternately outputs the video for right eye and the video for left eye with time t1, time t5, time t9, time t13, and time t17 set as switching timings.

A video period between the switching timings temporally adjacent to each other is equally divided into four. The video period starts in the first period P1 and ends in the fourth period P4. A video signal for right eye, which is a driving signal corresponding to the video for right eye, is written in the liquid crystal panels 560R, 560G, and 560B once in each of the periods, four times in total. Similarly, a video signal for left eye, which is a driving signal corresponding to the video for left eye, is written in the liquid crystal panels 560R, 560G, and 560B once in each of the periods, four times in total. Therefore, since the video signal for right eye and the video signal for left eye are alternately supplied at 60 Hz, the liquid crystal panels 560R, 560G, and 560B are driven at 480 Hz.

In the example shown in FIG. 7, for example, the video period for right eye between time t1 and time t5, which are the switching timings, starts in a first period from time t1 to time t2 and ends in a fourth period from time t4 to time t5. The same applies to the video period for left eye between time t5 and time t9, which are the switching timings, the video period for right eye between time t9 and time t13, which are the switching timings, and the video period for left eye between time t13 and time t17, which are the switching timings. In the example shown in FIG. 7, all the lengths of the first period to the fourth period are set equal. However, the lengths of the periods may be set different as appropriate according to necessity.

The shutter for right eye 412 is in an open state in at least a part of the video period for right eye in which the video signals for right eye 572R, 572G, and 572B, which are driving signals corresponding to the video for right eye, are input to the liquid crystal panels 560R, 560G, and 560B. In the example shown in FIG. 7, the shutter for right eye 412 is in a closed state from time t1 to time t2 and is in the open state from time t2 to time t5. The switching timings for opening and closing of the shutter for right eye 412 in the period from time t9 to time t13 are the same as the switching timings for opening and closing in the period from time t1 to time t5.

The shutter for left eye 414 is in an open state in at least a part of the video period for left eye in which the video signals for left eye 572R, 572G, and 572B, which are driving signals corresponding to the video for left eye, are input to the liquid crystal panels 560R, 560G, and 560B. In the example shown in FIG. 7, the shutter for left eye 414 is in a closed state from time t5 to time t6 and is in the open state from time t6 to time t9. The switching timings for opening and closing of the shutter for left eye 414 in the period from time t13 to time t17 are the same as the switching timings for opening and closing in the period from time t5 to time t9.

As explained above, the period in which the video signals for right eye 572R, 572G, and 572B are written in the liquid crystal panels 560R, 560G, and 560B is referred to as the video period for right eye (a first video period). Similarly, the period in which the video signals for left eye 572R, 572G, and 572B are written in the liquid crystal panels 560R, 560G, and 560B is referred to as the video period for left eye (a second video period).

That is, in the example shown in FIG. 7, in the video period for right eye, the first period P1 is a period in which the shutter for right eye 412 is closed. The second period P2 to the fourth period P4 are periods in which the shutter for right eye 412 is open. In a relation to writing of a video signal in the liquid crystal panels 560R, 560G, and 560B, the first period P1 is a period in which the video signal for right eye starts to be written in the liquid crystal panels 560R, 560G, and 560B in which the video signal for left eye is written. The second period P2 to the fourth period P4 are periods in which the video signal for right eye is repeatedly written in the liquid crystal panels 560R, 560G, and 560B in which the video signal for right eye is written.

Similarly, in the video period for left eye, the first period P1 is a period in which the shutter for left eye 414 is closed. The second period P2 to the fourth period P4 are periods in which the shutter for left eye 414 is open. In a relation to writing of a video signal in the liquid crystal panels 560R, 560G, and 560B, the first period P1 is a period in which the video signal for left eye starts to be written in the liquid crystal panels 560R, 560G, and 560B in which the video signal for right eye is written. The second period P2 to the fourth period P4 are periods in which the video signal for left eye is repeatedly written in the liquid crystal panels 560R, 560G, and 560B in which the video signal for left eye is written.

In other words, in each of the video period for right eye and the video period for left eye, in the first period P1, both of the shutter for right eye 412 and the shutter for left eye 414 are closed. In the second period P2 to the fourth period P4, of the shutter for right eye 412 and the shutter for left eye 414, the shutter on a side corresponding to a video signal is opened and the shutter on a side not corresponding to the video signal is closed. Therefore, a ratio of time when one of the shutters is open and time when both the shutters are closed in one of the video periods is 3:1.

A dimming operation of the discharge lamp 90 is performed while being synchronized with the operations of the shutter for right eye 412 and the shutter for left eye 414. That is, the first period P1 in which both of the shutter for right eye 412 and the shutter for left eye 414 are closed does not contribute to visual recognition of a video by the observer. Therefore, the first period P1 is set as a low luminance period in which the luminance of the discharge lamp 90 is reduced to, for example, about 55% of a rated value. The second period P2 to the fourth period P4 in which one of the shutter for right eye 412 and the shutter for left eye 414 is open are set as high luminance periods in which the luminance of the discharge lamp 90 is increased to, for example, about 115% of the rated value. Therefore, a time ratio of the high luminance periods and the low luminance period in one of the video periods is 3:1. By performing such a dimming operation, it is possible to solve a drawback of closing both of the shutter for right eye 412 and the shutter for left eye 414 and obtain a brighter video.

As explained above, in general, the alternating-current driving is preferable in order to prevent an excessively high state of the temperature of one of the electrodes. However, in this embodiment, since the dimming operation of the discharge lamp 90 is synchronized with a video signal, an alternating-current frequency applied to the discharge lamp 90 is extremely high, for example, several hundred hertz. Therefore, an anode operation time of the electrodes is short and the distal ends of the electrodes are less easily heated. When the deformation of the protrusions increases because of such a cause, the life of the discharge lamp 90 decreases.

Accordingly, the inventors has found that the meltability of the electrode distal ends is improved and the shape of the electrodes can be satisfactorily maintained by providing a moderately long period in which one of the polarities continues and securing the anode operation period rather than performing the simple alternating-current driving.

Figure 8:
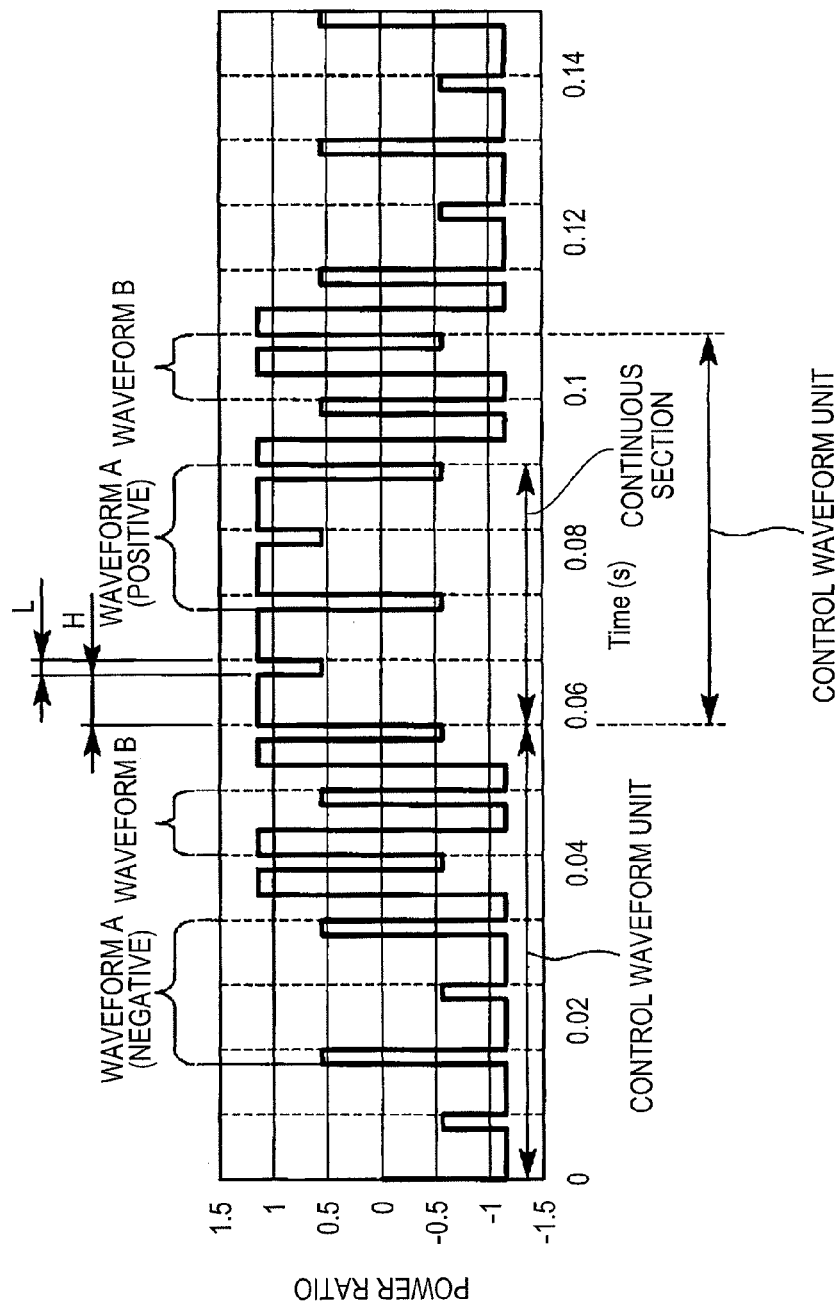
FIG. 8 is a diagram showing driving current waveforms of the discharge lamp.

FIG. 8 is a timing chart showing an example of a driving current waveform in this embodiment. The control unit 40 controls the discharge-lamp driving unit 230 according to the driving current waveform. The abscissa indicates time (second) and the ordinate indicates a power ratio. The power ratio is a relative value of driving power with respect to driving power in a rated normal mode (during 2D display) set to 1. If an inter-electrode distance is fixed, a driving voltage is considered to be fixed. At this point, the driving current and the driving power are in a proportional relation. Therefore, FIG. 8 can be regarded as a waveform indicating a relative value of a driving current with respect to a driving current in the rated normal mode (during 2D display) set to 1. In FIG. 8, a power ratio obtained when the second electrode 93 is the anode is represented as a positive value and a power ratio obtained when the first electrode 92 is the anode is represented as a negative value. In the following explanation, the polarity of the driving current I obtained when the second electrode 93 is the anode is represented as positive polarity and the polarity of the driving current I obtained when the first electrode 92 is the anode is represented as negative polarity.

As shown in FIG. 8, the driving current waveform is formed by repetition of two control waveform units having inverted polarities. In FIG. 8, two control waveform units and a part of a third control waveform unit are shown. The control waveform unit has a configuration in which a high luminance period H in which a driving current, an absolute value of which is relatively large, is supplied to the discharge lamp 90 and a low luminance period L in which a driving current, an absolute value of which is relatively small, is supplied to the discharge lamp 90 are alternately repeated over the entire control waveform unit.

In FIG. 8, one period divided by broken lines corresponds to one video period (one of the video period for right eye and the video period for left eye). A switching frequency for the video period for right eye and the video period for left eye is 60 Hz. A switching frequency for the shutter for right eye 412 and the shutter for left eye 414 is 60 Hz.

As explained above, the high luminance periods and the low luminance period are provided such that a time ratio thereof in one video period is 3:1. In the example shown in FIG. 8, when the power ratio (a driving current ratio) takes a positive value, the power ratio in the high luminance period is set to 1.15 and the power ratio in the low luminance period is set to 0.55. When the power ratio (the driving current ratio) takes a negative value, the power ratio in the high luminance period is set to −1.15 and the power ratio in the low luminance period is set to −0.55.

The control waveform unit includes a direct-current waveform pattern and an alternating-current waveform pattern. In the example shown in FIG. 8, a waveform pattern A (negative) and a waveform pattern A (positive) are equivalent to the direct-current waveform pattern. The direct-current waveform pattern includes a pattern in which the power ratio (the driving current ratio) in a first high luminance period H, the power ratio (the driving current ratio) in a first low luminance period L immediately after the first high luminance period H, and the power ratio (the driving current ratio) in a second high luminance period H immediately after the first low luminance period L have the same polarity. A waveform pattern B is equivalent to the alternating-current waveform pattern.

FIGS. 9A to 9D are enlarged diagrams showing waveform patterns forming a driving current waveform in the past. FIG. 9A shows a waveform pattern C in which the power ratio in the high luminance period H takes a negative value. FIG. 9B shows the waveform pattern C in which the power ratio in the high luminance period H takes a positive value. FIG. 9C shows a waveform pattern D in which the power ratio in the former half of the high luminance period H takes a negative value. FIG. 9D shows the waveform pattern D in which the power ratio in the former half of the high luminance period H takes a positive value.

For example, a driving current waveform is used in which a first high luminance period is formed by a direct-current waveform pattern C (negative) (FIG. 9A) or an alternating-current waveform pattern D (negative) (FIG. 9C) and, thereafter, formed by a direct-current waveform pattern C (positive) (FIG. 9B) or an alternating-current waveform pattern D (positive) (FIG. 9D) that starts with reverse polarity of the direct-current waveform pattern C (negative) or an alternating-current waveform pattern D (negative).

However, when the switching frequency for the video period for right eye and the video period for left eye is set to 60 Hz and the dimming operation of the discharge lamp 90 is synchronized with the video signal, time in which the driving current is retained in the same polarity in the high luminance period is 6.25 msec in the case of the waveform pattern C shown in FIGS. 9A and 9B and is 3.13 msec in the case of the waveform pattern D shown in FIGS. 9C and 9D. When the discharge lamp 90 is deteriorated, the meltability of the protrusions is low and the protrusions cannot be retained in the time of this degree. As a result, an arc length increases and the discharge lamp 90 is deteriorated in a short time.

On the other hand, FIGS. 10A to 10D are enlarged diagrams showing waveform patterns forming the driving current waveform in this embodiment shown in FIG. 8. FIG. 10A shows a waveform pattern A in which the driving current in the same polarity continuing period takes a negative value. FIG. 10B shows the waveform pattern A in which the driving current in the same polarity continuing period takes a positive value. FIG. 10C shows a waveform pattern B in which the power ratio in the first high luminance period takes a negative value. FIG. 10D shows the waveform pattern B in which the power ratio in the first high luminance period takes a positive value.

As shown in FIGS. 10A and 10B, the waveform pattern A (negative) and the waveform pattern A (positive) are basically direct-current waveform patterns. Specifically, the waveform pattern A (negative) includes a pattern in which the power ratio (the driving current ratio) in a first high luminance period H1, the power ratio (the driving current ratio) in a first low luminance period L1 immediately after the first high luminance period H1, and the power ratio (the driving current ratio) in a second high luminance period H2 immediately after the first low luminance period L1 have negative polarity and the power ratio (the driving current ratio) in a second low luminance period L2 immediately after the second high luminance period H2 has positive polarity.

The waveform pattern A (positive) includes a pattern in which the power ratio (the driving current ratio) in the first high luminance period H1, the power ratio (the driving current ratio) in the first low luminance period L1 immediately after the first high luminance period H1, and the power ratio (the driving current ratio) in the second high luminance period H2 immediately after the first low luminance period L1 have positive polarity and the power ratio (the driving current ratio) in the second low luminance period L2 immediately after the second high luminance period H2 has negative polarity. That is, the driving current waveform in this embodiment has a period in which the driving current has the same polarity over two video periods temporally adjacent to each other.

As shown in FIGS. 10C and 10D, the waveform pattern B (negative) and the waveform pattern B (positive) are basically alternating-current waveform patterns. That is, both of the waveform pattern B (negative) and the waveform pattern B (positive) show alternating-current waveforms over the high luminance period H and the low luminance period L.

Referring back to FIG. 8, in the driving current waveform in this embodiment, a first control waveform unit (at the left end) includes the waveform pattern A (negative) (FIG. 10A), which is one of direct-current waveform patterns, and the waveform pattern B (negative) (FIG. 10C) and the waveform pattern B (positive) (FIG. 10D), which are alternating-current waveform patterns. A second control waveform unit (second from the left end) includes the waveform pattern A (positive) (FIG. 10B), which is one of direct-current waveform patterns, and the waveform pattern B (negative) (FIG. 10C) and the waveform pattern B (positive) (FIG. 10D), which are alternating-current waveform patterns. In the driving current waveform, these control waveform units are repeatedly arranged.

As explained above, when the driving current waveform in the past is adopted, the time in which the driving current is retained in the same polarity is 6.25 msec or 3.13 msec. On the other hand, when the driving current waveform in this embodiment is adopted, as shown in FIGS. 10A and 10B, the time in which the driving current is continuously retained in the same polarity can be increased to 14.6 msec. Consequently, the meltability of the protrusions at the electrode distal ends of the discharge lamp 90 is improved and the shape of the protrusions is easily retained. As a result, it is possible to improve the life of the discharge lamp 90.

Since the high luminance periods H1 and H2 and the low luminance period L1 are included in the period in which the driving current is continuously retained in the same polarity, the driving current is not fixed and fluctuates according to the periods. Consequently, fluctuation is given to the temperature of the electrodes and a stimulus is given to the protrusions in a melted state. Further, since the alternating-current waveform pattern is included in the control waveform unit, the meltability of the electrodes is suppressed from becoming too high. According to the combination of the effects explained above, it is possible to remarkably improve the action of retaining the protrusions.

In the case of this embodiment, even when the dimming of the discharge lamp 90 is performed as explained above, since the dimming switching timings for the discharge lamp 90 and the switching timings for the video signal and the active shutter glasses 410 are synchronized, the observer cannot view a video in the low luminance period. Therefore, it is possible to suppress occurrence of scroll noise.

Second Embodiment

A second embodiment of the invention is explained below with reference to FIGS. 11A and 11B.

A basic configuration of a projection system in this embodiment is the same as the basic configuration in the first embodiment. A basic configuration of a projector included in the projection system is also the same as the basic configuration in the first embodiment. This embodiment is different from the first embodiment only in a driving current waveform of a discharge lamp.

Therefore, in this embodiment, explanation of the basic configurations of the projection system and the projector is omitted.

The driving current waveform in the first embodiment has a period in which the driving current has the same polarity over the two video periods temporally adjacent to each other. On the other hand, a driving current waveform in this embodiment has a period in which a driving current has the same polarity over three video periods temporally adjacent to one another.

Figure 11A:
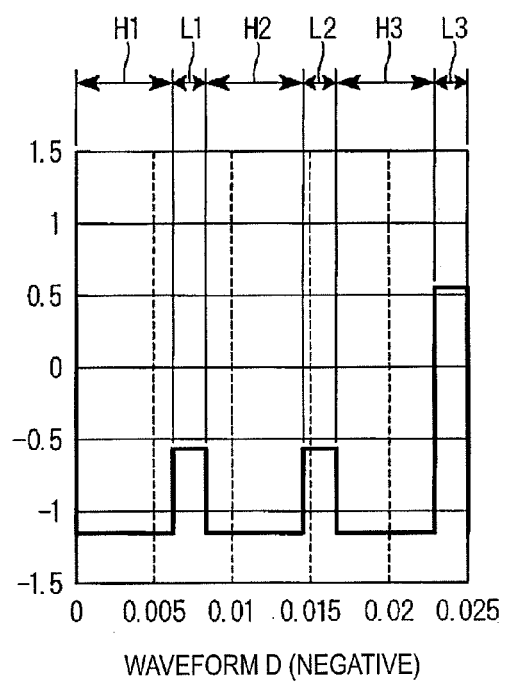
FIGS. 11A and 11B are enlarged diagrams showing a part of driving current waveforms in a second embodiment.
Figure 11B:
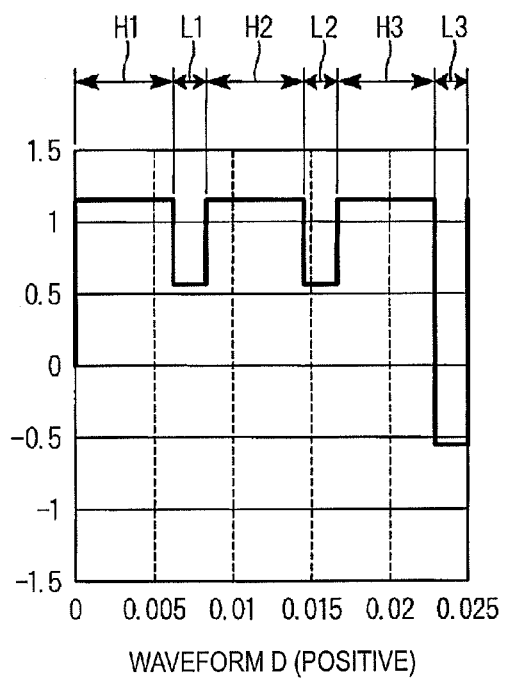

FIGS. 11A and 11B are enlarged diagrams showing waveform patterns forming the driving current waveform in this embodiment. FIG. 11A shows a waveform pattern D in which a driving current in the same polarity continuing period takes a negative value. FIG. 11B shows the waveform pattern D in which the driving current in the same polarity continuing period takes a positive value.

As shown in FIG. 11A, the waveform pattern D (negative) includes a pattern in which the power ratio (the driving current ratio) in the first high luminance period H1, the power ratio (the driving current ratio) in the first low luminance period L1 immediately after the first high luminance period H1, the power ratio (the driving current ratio) in the second high luminance period H2 immediately after the first low luminance period L1, the power ratio (the driving current ratio) in the second low luminance period L2 immediately after the second high luminance period H2, and the power ratio (the driving current ratio) in a third high luminance period H3 immediately after the second low luminance period L2 have negative polarity and the power ratio (the driving current ratio) in a third low luminance period L3 immediately after the third high luminance period H3 has positive polarity.

As shown in FIG. 11B, the waveform pattern D (positive) includes a pattern in which the power ratio (the driving current ratio) in the first high luminance period H1, the power ratio (the driving current ratio) in the first low luminance period L1 immediately after the first high luminance period H1, the power ratio (the driving current ratio) in the second high luminance period H2 immediately after the first low luminance period L1, the power ratio (the driving current ratio) in the second low luminance period L2 immediately after the second high luminance period H2, and the power ratio (the driving current ratio) in the third high luminance period H3 immediately after the second low luminance period L2 have positive polarity and the power ratio (the driving current ratio) in the third low luminance period L3 immediately after the third high luminance period H3 has negative polarity.

In this embodiment, presentation of the entire driving current waveform is omitted. However, for example, instead of the waveform pattern A (negative) and the waveform pattern A (positive) of the driving current waveform shown in FIG. 8 in the first embodiment, the waveform pattern D (negative) and the wave form pattern D (positive) shown in FIGS. 11A and 11B can be adopted as appropriate.

In the case of the driving current waveform in this embodiment, since a period in which the driving current I has the same polarity over three video periods temporally adjacent to one another is provided, the period in which the driving current I is continuously retained in the same polarity is longer compared with the first embodiment. When the driving current waveform in the first embodiment is adopted, the time in which the driving current I is retained in the same polarity is 14.6 msec. On the other hand, when the driving current waveform in this embodiment is adopted, as shown in FIGS. 11A and 11B, the time in which the driving current I is continuously retained in the same polarity can be increased to 23 msec. Consequently, it is possible to cope with further progress of the deterioration of the electrodes.

Third Embodiment

A third embodiment of the invention is explained below.

A basic configuration of a projection system in this embodiment is the same as the basic configuration in the first embodiment. A basic configuration of a projector included in the projection system is also the same as the basic configuration in the first embodiment. This embodiment is different from the first embodiment only in a driving current waveform of a discharge lamp.

Therefore, in this embodiment, explanation of the basic configurations of the projection system and the projector is omitted.

For example, a waveform pattern having a period in which a driving current has the same polarity over a plurality of video periods may be used in one control waveform unit on a one-off basis. On the other hand, a plurality of waveform patterns having a period in which a driving current has the same polarity over a plurality of video period may be continuously used as in the period described as the continuous section in FIG. 8. By providing such a continuous period, the temperature of the electrode functioning as the anode effectively rises and the meltability of the protrusions can be secured. Consequently, it is possible to suppress deformation of the protrusions and realize the extension of the life of the discharge lamp 90.

For example, when control is performed in basic order of the waveform pattern A (negative), the waveform pattern B (negative), the waveform pattern A (positive), and the waveform pattern B (positive), if a waveform pattern having one of the polarities is inserted, the temperature of the electrodes clearly changes. In a state in which the electrodes are not deteriorated, even when a waveform pattern having a period in which a driving current has the same polarity over a plurality of video periods is used on a one-off basis, the effect of retaining the protrusions of the electrodes is also obtained. However, in a state in which the electrodes are deteriorated and a driving voltage (a lamp voltage) rises, a driving current value decreases and the protrusions are less easily melted. It is necessary to raise the temperature of the electrodes in order to melt the protrusions. When a period in which the driving current has one of the polarities is too long, it is likely that excessive melting of the electrode functioning as the anode and deformation of the electrode functioning as the cathode are caused. Therefore, there is a limit in the length of the period in which the driving current has one of the polarities.

Therefore, it is possible to raise the temperature of one of the electrodes together with the temperature of the discharge lamp 90 by continuously using a waveform pattern biased to one of the polarities within a proper time. Consequently, it is possible to improve the meltability of the protrusions compared with the meltability obtained when the waveform pattern biased to one of the polarities is used on a one-off basis and realize the extension of the life of the discharge lamp 90.

An example of a relation between a driving voltage (a lamp voltage) and time ratios of the waveform patterns is shown in Table 1. Numbers in Table 1 are absolute values of time ratios in one control waveform unit.

TABLE 1

| Lamp voltage | Waveform A (negative) | Waveform B (negative) | Waveform A (positive) | Waveform B (positive) |
| --- | --- | --- | --- | --- |
| 60 V or lower | 1 | 4 | 1 | 4 |
| 60 V To 70 V | 2 | 8 | 2 | 8 |
| 70 V To 80 V | 4 | 16 | 4 | 8 |
| 80 V or higher | 8 | 32 | 8 | 32 |

As shown in Table 1, for example, when the driving voltage (the lamp voltage) is 60 V or lower, time of the waveform pattern A (negative) shown in FIG. 10A is 1, time of the waveform pattern B (negative) shown in FIG. 100 is 4, time of the waveform pattern A (positive) shown in FIG. 10B is 1, and time of the waveform pattern B (positive) shown in FIG. 10D is 4. On the other hand, for example, when the driving voltage is 80 V or higher, the time of the waveform pattern A (negative) shown in FIG. 10A is 8, the time of the waveform pattern B (negative) shown in FIG. 100 is 32, the time of the waveform pattern A (positive) shown in FIG. 10B is 8, and the time of the waveform pattern B (positive) shown in FIG. 10D is 32.

In this way, it is preferable to increase the time of the waveform pattern having the period in which the driving current has the same polarity (extend the period in which the driving current has the same polarity) according to an increase in the driving voltage. However, in this example, even if the driving voltage changes, a ratio of the time of the waveform pattern A and the time of the waveform pattern B is fixed at 1:4.

Fourth Embodiment

A fourth embodiment of the invention is explained below.

A basic configuration of a projection system in this embodiment is the same as the basic configuration in the first embodiment. A basic configuration of a projector included in the projection system is also the same as the basic configuration in the first embodiment. This embodiment is different from the first embodiment only in a driving current waveform of a discharge lamp.

Therefore, in this embodiment, explanation of the basic configurations of the projection system and the projector is omitted.

In the third embodiment, although the time of the waveform pattern A in which the same polarity continues is increased (the period in which the driving current has the same polarity is extended) according to the deterioration of the electrodes of the discharge lamp, the ratio of the time of the direct-current waveform pattern A in which the same polarity continues and the time of the alternating-current waveform pattern B in which the polarities are inverted is fixed. On the other hand, in this embodiment, the ratio of the time of the direct-current waveform pattern A in which the same polarity continues and the time of the alternating-current waveform pattern B in which the polarities are inverted is changed and a time ratio of an application period of the direct-current waveform pattern A in one control waveform unit is increased.

The entire driving current waveform is formed by the waveform pattern A (negative), the waveform pattern B, the waveform pattern A (positive), and the waveform pattern B. Concerning the waveform pattern B, there are a pattern in which the polarity of a first high luminance period is negative and a pattern in which the polarity of the first high luminance period is positive. These patterns can be combined as appropriate.

An example in which a time ratio of waveform patterns is changed according to a change in a driving voltage is shown in Table 2. Since a driving current waveform is symmetrical, Table 2 is represented by time (sec) in one control waveform unit formed by only the waveform pattern A having one of the polarities. A number in parentheses is a repetition cycle number of the waveform pattern.

TABLE 2

| Lamp voltage | Waveform A (s) | Waveform B (s) |
| --- | --- | --- |
| 60 V or lower | 0.017 (1 cycle) | 1 (120 cycles) |
| 60 V To 70 V | 0.017 (1 cycle) | 0.1 (12 cycles) |
| 70 V To 80 V | 0.067 (4 cycles) | 0.1 (12 cycles) |
| 80 V or higher | 0.067 (4 cycles) | 0.025 (3 cycles) |

In Table 2, for example, when the driving voltage is 60 V or lower, the time of the waveform pattern A is 0.017 sec (1 cycle) and the time of the waveform pattern B is 1 sec (120 cycles). On the other hand, for example, when the driving voltage is 80 V or higher, the time of the waveform pattern A is 0.067 sec (4 cycles) and the time of the waveform pattern B is 0.025 sec (3 cycles).

In this way, as the deterioration of the electrodes advances and the driving voltage increases, the time ratio of the waveform pattern A in one control waveform unit is increased. As the time ratio of the waveform pattern A increases, an arc length increases. Even if a driving current value decreases, it is possible to secure the meltability of the protrusions. As a result, it is possible to suppress deformation of the protrusions and realize the extension of the life of the discharge lamp 90. Further, by reducing the time ratio of the waveform pattern A, it is possible to suppress the driving voltage from excessively decreasing.

It is desirable to continuously use the waveform pattern A rather than simply increasing the time ratio of the waveform pattern A. Then, since a heat radiation loss caused by setting the waveform pattern A in opposite polarities is reduced, it is possible to further increase the temperature of the electrodes. Therefore, it is possible to more effectively realize the effects explained above.

Fifth Embodiment

A fifth embodiment of the invention is explained below with reference to FIGS. 12A to 12D.

A basic configuration of a projection system in this embodiment is the same as the basic configuration in the first embodiment. A basic configuration of a projector included in the projection system is also the same as the basic configuration in the first embodiment. This embodiment is different from the first embodiment only in a driving current waveform of a discharge lamp.

Therefore, in this embodiment, explanation of the basic configurations of the projection system and the projector is omitted.

In the fourth embodiment, the time ratio of the waveform pattern A and the waveform pattern B is adjusted, whereby the temperature of the electrodes is adjusted to obtain an appropriate arc length. On the other hand, in this embodiment, high luminance periods in which polarities are opposite are respectively provided before and after the first high luminance period and the lengths of the high luminance periods are adjusted, whereby the temperature of the electrodes is adjusted.

Figures 12A, 12B, 12C, 12D:
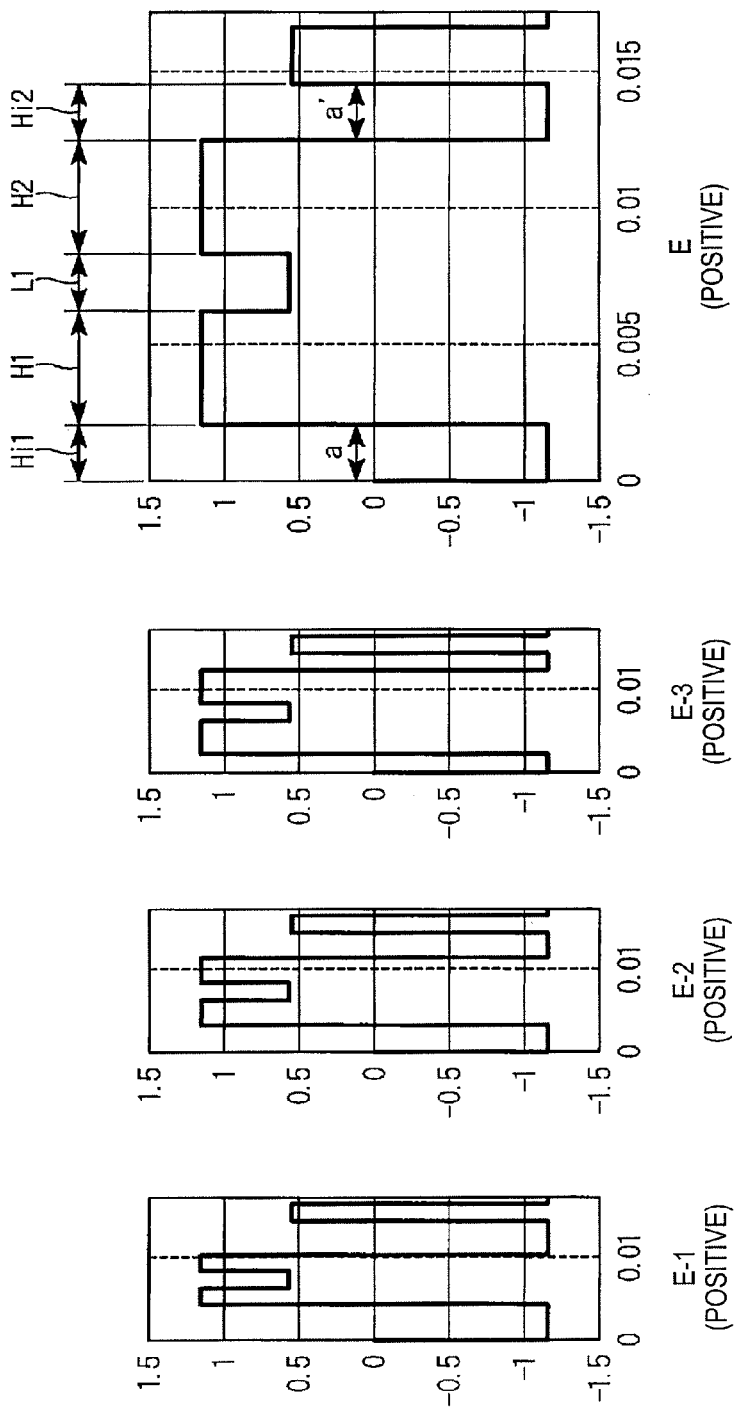
FIGS. 12A to 12D are enlarged diagrams showing a part of driving current waveforms in a fifth embodiment.

FIGS. 12A to 12D are enlarged diagrams showing waveform patterns forming a driving current waveform in this embodiment. FIGS. 12A to 12C show three kinds of waveform patterns in each of which the length of an opposite polarity high luminance period is changed. FIG. 12D shows a basic waveform pattern. In FIGS. 12A to 12D, an example in which the continuous same polarity is positive is shown. However, an example in which the continuous same polarity is negative is considered the same.

In this embodiment, as shown in FIG. 12D, a high luminance period Hi1 in which the driving current I has negative polarity is provided immediately before the first high luminance period H1 in which the driving current I has positive polarity. The length of the negative polarity high luminance period Hi1 (referred to as first negative polarity high luminance period) is represented as "a". A high luminance period Hi2 in which the driving current I has negative polarity is also provided immediately after the second high luminance period H2 in which the driving current I has positive polarity. The length of the negative polarity high luminance period Hi2 (referred to as second negative polarity high luminance period) is represented as "a'".

In this embodiment, each of the length "a" of the first negative polarity high luminance period and the length "a'" of the second negative polarity high luminance period is changed according to a change in the driving voltage. An example of the change in the lengths of the negative polarity high luminance periods is shown in FIG. 3. In Table 3, a waveform pattern E-1 corresponds to FIG. 12A, a waveform pattern E-2 corresponds to FIG. 12B, a waveform pattern E-3 corresponds to FIG. 12C, and the waveform pattern A corresponds to FIG. 10B in the first embodiment. The waveform patterns E-1 to E-3 and the waveform pattern A are set to 4 cycles and the waveform pattern B (alternating current) is set to 3 cycles.

TABLE 3

| Lamp voltage | Waveform | a (ms) | a' (ms) |
|---|---|---|---|
| 60 V or lower | Waveform E-1 | 3.1 | 3.1 |
| 60 V To 70 V | Waveform E-2 | 2.2 | 2.2 |
| 70 V To 80 V | Waveform E-3 | 1.4 | 1.4 |
| 80 V or higher | Waveform A | 0 | 0 |

In Table 3, for example, when the driving voltage is 60 V or lower, both of the length "a" of the first negative polarity high luminance period Hi1 and the length "a'" of the second negative polarity high luminance period Hi1 are 3.1 msec. The waveform pattern E-1 is applied. When the driving voltage is 60 V to 70 V, both of the length "a" of the first negative polarity high luminance period Hi1 and the length "a'" of the second negative polarity high luminance period Hi2 are 2.2 msec. The waveform pattern E-2 is applied. When the driving voltage is 70 V to 80 V, both of the length "a" of the first negative polarity high luminance period Hi1 and the length "a'" of the second negative polarity high luminance period Hi2 are 1.4 msec. The waveform pattern E-3 is applied. When the driving voltage is 80 V or higher, both of the length "a" of the first negative polarity high luminance period Hi1 and the length "a'" of the second negative polarity high luminance period Hi2 are 0 msec. That is, the first negative polarity high luminance period Hi1 and the second negative polarity high luminance period Hi2 are not provided. The waveform pattern A is applied.

In this embodiment, effects same as the effects in the fourth embodiment can be obtained, i.e., the meltability of the protrusions can be secured even when the electrodes are deteriorated and the extension of the life of the discharge lamp can be realized. In this embodiment, the length "a" of the first negative polarity high luminance period Hi1 and the length "a" of the second negative polarity high luminance period Hi2 are set the same. However, the length "a" of the first negative polarity high luminance period Hi1 and the length "a'" of the second negative polarity high luminance period Hi2 may be set different.

First Modification

In the embodiments, time ratios of the waveform pattern E-1, the waveform pattern E-2, the waveform pattern E-3, and the waveform pattern A may be changed according to a change in the driving voltage. An example of the change in the time ratios is shown in Table 4. The waveform patterns E-1, E-2, E-3, and A set to 4 cycles and the waveform pattern B set to 3 cycles are formed as one control waveform unit. Any one of the waveform patterns E-1, E-2, E-3, and A is independently combined with the waveform pattern B and repeated.

TABLE 4

| Lamp voltage | Waveform E-1 | Waveform E-2 | Waveform E-3 | Waveform A |
|---|---|---|---|---|
| 60 V or lower | 100 | 10 | 10 | 1 |
| 60 V To 70 V | 10 | 100 | 10 | 1 |
| 70 V To 80 V | 10 | 10 | 100 | 1 |
| 80 V or higher | 1 | 10 | 10 | 100 |

As shown in Table 4, for example, when the driving voltage is 60 V or lower, the time ratio of the waveform pattern E-1 is set to 100, the time ratio of the waveform pattern E-2 is set to 10, the time ratio of the waveform pattern E-3 is set to 10, and the time ratio of the waveform pattern A is set to 1. For example, when the driving voltage is 80 V or higher, the time ratio of the waveform pattern E-1 is set to 1, the time ratio of the waveform pattern E-2 is set to 10, the time ratio of the waveform pattern E-3 is set to 10, and the time ratio of the waveform pattern A is set to 100.

In this modification, effects same as the effects in the embodiments can be obtained, i.e., the meltability of the protrusions can be secured even when the electrodes are deteriorated and the extension of the life of the discharge lamp can be realized.

Second Modification

In the embodiments, composition ratios of the waveform pattern E-1, the waveform pattern E-2, the waveform pattern E-3, and the waveform pattern A may be changed in one control waveform unit according to a change in the driving voltage. An example of the change in the composition ratios is shown in Table 5. The waveform patterns E-1, E-2, E-3, and A set to 12 cycles in total and the waveform pattern B set to 4 cycles are formed as one control waveform unit. 12 cycles are shared by the waveform patterns E-1, E-2, E-3, and A.

TABLE 5

| Lamp voltage | Waveform E-1 | Waveform E-2 | Waveform E-3 | Waveform A |
|---|---|---|---|---|
| 60 V or lower | 9 | 1 | 1 | 1 |
| 60 V To 70 V | 2 | 7 | 2 | 1 |
| 70 V To 80 V | 1 | 2 | 7 | 2 |

TABLE 5-continued

| Lamp voltage | Waveform E-1 | Waveform E-2 | Waveform E-3 | Waveform A |
|---|---|---|---|---|
| 80 V or higher | 1 | 1 | 1 | 9 |

As shown in Table 5, for example, when the driving voltage is 60 V or lower, the composition ratio of the waveform pattern E-1 is set to 9 cycles, the composition ratio of the waveform pattern E-2 is set to 1 cycle, the composition ratio of the waveform pattern E-3 is set to 1 cycle, and the composition ratio of the waveform pattern A is set to 1 cycle. For example, when the driving voltage is 80 V or higher, the composition ratio of the waveform pattern E-1 is set to 1 cycle, the composition ratio of the waveform pattern E-2 is set to 1 cycle, the composition ratio of the waveform pattern E-3 is set to 1 cycle, and the composition ratio of the waveform pattern A is set to 9 cycles.

In this modification, effects same as the effects in the embodiments can be obtained, i.e., the meltability of the protrusions can be secured even when the electrodes are deteriorated and the extension of the life of the discharge lamp can be realized.

The technical scope of the invention is not limited to the embodiments. Various changes can be made without departing from the spirit of the invention.

For example, in the waveform patterns A, B, D, E, and the like used in the embodiments, the waveform patterns are the direct-current waveform patterns in the low luminance period. However, the waveform patterns may be alternating-current waveform patterns. Besides the configuration by the active shutter glasses, a device that converts emitted polarized light or a wavelength according to switching of an image for right eye and an image for left eye may be provided in the projector. Filters that transmit light corresponding to the emitted polarized light or the wavelength may be respectively provided on the left and right of glasses. In this case, by setting a transition period of the images as the low luminance period, it is possible to suppress a mixed image of left and right images from reaching the observer in the transition period. Specific configurations of the units of the projector can be changed as appropriate.

The entire disclosure of Japanese Patent Application No. 2012-274698, filed Dec. 17, 2012 is expressly incorporated by reference herein.

What is claimed is:

1. A projector comprising:
a discharge lamp configured to emit light;
a discharge-lamp driving unit configured to supply a driving current for driving the discharge lamp to the discharge lamp;
a control unit configured to control the discharge-lamp driving unit;
a light modulating element configured to modulate, according to a video signal, the light emitted from the discharge lamp; and
a projection optical system configured to project the light modulated by the light modulating element on a projection surface, wherein
the control unit is a control waveform unit configured to alternately repeat a high luminance period in which the driving current having a relatively large absolute value is supplied to the discharge lamp and a low luminance period in which the driving current having a relatively small absolute value is supplied to the discharge lamp, the control unit controlling the discharge-lamp driving unit according to a driving current waveform formed by the control waveform unit including a direct-current waveform pattern in which the driving current in a first high luminance period, the driving current in a first low luminance period immediately after the first high luminance period, and the driving current in a second high luminance period immediately after the first low luminance period have the same first polarity.

2. The projector according to claim 1, wherein the control waveform unit includes the direct-current waveform pattern and an alternating-current waveform pattern.

3. A projection system comprising:
the projector according to claim 2; and
active shutter glasses including a shutter for right eye and a shutter for left eye, wherein
the video signal includes a video signal for right eye and a video signal for left eye,
a video period for right eye in which the video signal for right eye is written in the light modulating element and a video period for left eye in which the video signal for left eye is written in the light modulating element are alternately repeated, and
switching of the video period for right eye and the video period for left eye in the light modulating element and switching of opening and closing operations for the shutter for right eye and the shutter for left eye in the active shutter glasses are synchronized.

4. The projector according to claim 1, wherein
the video signal includes a first video signal and a second video signal,
a first video period in which the first video signal is written in the light modulating element a plurality of number of times and a second video period in which the second video signal is written in the light modulating element a plurality of number times are alternately repeated,
in each of the first video period and the second video period, a period in which the second video signal is written in the light modulating element in which the first video signal is written or a period in which the first video signal is written in the light modulating element in which the second video signal is written is the low luminance period, and
a period in which the first video signal is written in the light modulating element in which the first video signal is written or a period in which the second video signal is written in the light modulating element in which the second video signal is written is the high luminance period.

5. The projector according to claim 4, wherein the first video period is a video period for right eye and the second video period is a video period for left eye.

6. A projection system comprising:
the projector according to claim 5; and
active shutter glasses including a shutter for right eye and a shutter for left eye, wherein
the video signal includes a video signal for right eye and a video signal for left eye,
a video period for right eye in which the video signal for right eye is written in the light modulating element and a video period for left eye in which the video signal for left eye is written in the light modulating element are alternately repeated, and
switching of the video period for right eye and the video period for left eye in the light modulating element and switching of opening and closing operations for the shutter for right eye and the shutter for left eye in the active shutter glasses are synchronized.

7. A projection system comprising:
the projector according to claim 4; and
active shutter glasses including a shutter for right eye and a shutter for left eye, wherein
the video signal includes a video signal for right eye and a video signal for left eye,
a video period for right eye in which the video signal for right eye is written in the light modulating element and a video period for left eye in which the video signal for left eye is written in the light modulating element are alternately repeated, and
switching of the video period for right eye and the video period for left eye in the light modulating element and switching of opening and closing operations for the shutter for right eye and the shutter for left eye in the active shutter glasses are synchronized.

8. The projector according to claim 1, wherein the control waveform unit includes a waveform pattern in which the driving current in a second low luminance period immediately before the first high luminance period or immediately after the second high luminance period has second polarity opposite to the first polarity.

9. A projection system comprising:
the projector according to claim 8; and
active shutter glasses including a shutter for right eye and a shutter for left eye, wherein
the video signal includes a video signal for right eye and a video signal for left eye,
a video period for right eye in which the video signal for right eye is written in the light modulating element and a video period for left eye in which the video signal for left eye is written in the light modulating element are alternately repeated, and
switching of the video period for right eye and the video period for left eye in the light modulating element and switching of opening and closing operations for the shutter for right eye and the shutter for left eye in the active shutter glasses are synchronized.

10. The projector according to claim 1, wherein the control unit controls the discharge-lamp driving unit to increase a ratio of an application period of the direct-current waveform pattern in an entire period of the control waveform unit according to an increase in a driving voltage.

11. The projector according to claim 10, wherein the control unit controls the discharge-lamp driving unit to increase a ratio of a continuous application period of the direct-current waveform pattern in the entire period of the control waveform unit according to the increase in the driving voltage.

12. A projection system comprising:
the projector according to claim 11; and
active shutter glasses including a shutter for right eye and a shutter for left eye, wherein
the video signal includes a video signal for right eye and a video signal for left eye,
a video period for right eye in which the video signal for right eye is written in the light modulating element and a video period for left eye in which the video signal for left eye is written in the light modulating element are alternately repeated, and
switching of the video period for right eye and the video period for left eye in the light modulating element and switching of opening and closing operations for the shutter for right eye and the shutter for left eye in the active shutter glasses are synchronized.

13. A projection system comprising:
the projector according to claim 10; and
active shutter glasses including a shutter for right eye and a shutter for left eye, wherein
the video signal includes a video signal for right eye and a video signal for left eye,
a video period for right eye in which the video signal for right eye is written in the light modulating element and a video period for left eye in which the video signal for left eye is written in the light modulating element are alternately repeated, and
switching of the video period for right eye and the video period for left eye in the light modulating element and switching of opening and closing operations for the shutter for right eye and the shutter for left eye in the active shutter glasses are synchronized.

14. The projector according to claim 1, wherein the control waveform unit includes, at least immediately before the first high luminance period or immediately after the second high luminance period, a second polarity high luminance period in which the driving current has second polarity opposite to the first polarity.

15. The projector according to claim 14, wherein the control unit controls the discharge-lamp driving unit to reduce the second polarity high luminance period according to an increase in the driving voltage or increase a ratio of a relatively short application period of the second polarity high luminance period according to the increase in the driving voltage.

16. A projection system comprising:
the projector according to claim 15; and
active shutter glasses including a shutter for right eye and a shutter for left eye, wherein
the video signal includes a video signal for right eye and a video signal for left eye,
a video period for right eye in which the video signal for right eye is written in the light modulating element and a video period for left eye in which the video signal for left eye is written in the light modulating element are alternately repeated, and
switching of the video period for right eye and the video period for left eye in the light modulating element and switching of opening and closing operations for the shutter for right eye and the shutter for left eye in the active shutter glasses are synchronized.

17. A projection system comprising:
the projector according to claim 14; and
active shutter glasses including a shutter for right eye and a shutter for left eye, wherein
the video signal includes a video signal for right eye and a video signal for left eye,
a video period for right eye in which the video signal for right eye is written in the light modulating element and a video period for left eye in which the video signal for left eye is written in the light modulating element are alternately repeated, and
switching of the video period for right eye and the video period for left eye in the light modulating element and switching of opening and closing operations for the shutter for right eye and the shutter for left eye in the active shutter glasses are synchronized.

18. A projection system comprising:
the projector according to claim 1; and
active shutter glasses including a shutter for right eye and a shutter for left eye, wherein
the video signal includes a video signal for right eye and a video signal for left eye, a video period for right eye in which the video signal for right eye is written in the light modulating element and a video period for left eye in which the video signal for left eye is written in the light modulating element are alternately repeated, and switching of the video period for right eye and the video period for left eye in the light modulating element and switching of opening and closing operations for the shutter for right eye and the shutter for left eye in the active shutter glasses are synchronized.

19. The projection system according to claim 18, wherein both of the shutter for right eye and the shutter for left eye are closed in a period in which the video signal for right eye and the video signal for left eye are mixed in the light modulating element.

* * * * *